United States Patent
Zhang et al.

(10) Patent No.: US 12,375,719 B2
(45) Date of Patent: *Jul. 29, 2025

(54) SELECTIVE USE OF ADAPTIVE IN-LOOP COLOR-SPACE TRANSFORM AND OTHER VIDEO CODING TOOLS

(71) Applicants: Beijing Bytedance Network Technology Co., Ltd., Beijing (CN); Bytedance Inc., Los Angeles, CA (US)

(72) Inventors: Li Zhang, San Diego, CA (US); Jizheng Xu, San Diego, CA (US); Kai Zhang, San Diego, CA (US); Hongbin Liu, Beijing (CN); Weijia Zhu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,093

(22) Filed: Sep. 21, 2023

(65) Prior Publication Data
US 2024/0015328 A1    Jan. 11, 2024

Related U.S. Application Data

(63) Continuation of application No. 17/556,769, filed on Dec. 20, 2021, now Pat. No. 11,778,233, which is a
(Continued)

(51) Int. Cl.
*H04N 11/02* (2006.01)
*H04N 9/67* (2023.01)
(Continued)

(52) U.S. Cl.
CPC ............... *H04N 19/61* (2014.11); *H04N 9/67* (2013.01); *H04N 19/105* (2014.11);
(Continued)

(58) Field of Classification Search
CPC ...... H04N 19/61; H04N 19/105; H04N 19/11; H04N 19/119; H04N 19/12; H04N 19/124;
(Continued)

(56) References Cited

U.S. PATENT DOCUMENTS 9,912,925 B2    3/2018    Ye
9,955,174 B2    4/2018    Ye
(Continued)

FOREIGN PATENT DOCUMENTS

CN    104509113 A    4/2015
CN    105308959 A    2/2016
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
(Continued)

*Primary Examiner* — Jayanti K Patel
*Assistant Examiner* — Richard B Carter
(74) *Attorney, Agent, or Firm* — Conley Rose, P.C.

(57) ABSTRACT

A method of video processing is provided. The method includes: determining, for a conversion between a current video unit of a video and a coded representation of the video, that applicability of a first coding tool and a second coding tool is mutually exclusive; and performing the conversion based on the determining, wherein the first coding tool corresponds to an adaptive color space transformation
(Continued)

(ACT) tool; wherein use of the ACT tool comprises: converting, during encoding, a representation of a visual signal from a first color domain to a second color domain, or converting, during decoding, a representation of a visual signal from the second color domain to the first color domain.

18 Claims, 22 Drawing Sheets

Related U.S. Application Data continuation of application No. PCT/CN2020/097370, filed on Jun. 22, 2020.

(51) Int. Cl.
| | |
|---|---|
| *H04N 19/105* | (2014.01) |
| *H04N 19/11* | (2014.01) |
| *H04N 19/119* | (2014.01) |
| *H04N 19/12* | (2014.01) |
| *H04N 19/124* | (2014.01) |
| *H04N 19/132* | (2014.01) |
| *H04N 19/159* | (2014.01) |
| *H04N 19/169* | (2014.01) |
| *H04N 19/17* | (2014.01) |
| *H04N 19/186* | (2014.01) |
| *H04N 19/30* | (2014.01) |
| *H04N 19/61* | (2014.01) |
| *H04N 19/70* | (2014.01) |

(52) U.S. Cl.
CPC ........... *H04N 19/11* (2014.11); *H04N 19/119* (2014.11); *H04N 19/12* (2014.11); *H04N 19/124* (2014.11); *H04N 19/132* (2014.11); *H04N 19/159* (2014.11); *H04N 19/17* (2014.11); *H04N 19/186* (2014.11); *H04N 19/1883* (2014.11); *H04N 19/30* (2014.11); *H04N 19/70* (2014.11)

(58) Field of Classification Search
CPC .... H04N 19/132; H04N 19/159; H04N 19/17; H04N 19/186; H04N 19/1883; H04N 19/30; H04N 19/70; H04N 9/67
USPC .................................................... 375/240.03
See application file for complete search history.

(56) References Cited

U.S. PATENT DOCUMENTS

| | | | |
|---|---|---|---|
| 10,057,578 B2 | 8/2018 | Rapaka | |
| 10,116,937 B2 | 10/2018 | Li | |
| 10,142,642 B2 | 11/2018 | Zhang | |
| 10,154,286 B2 | 12/2018 | He | |
| 10,171,833 B2 | 1/2019 | Li | |
| 10,390,029 B2 | 8/2019 | Ye | |
| 10,440,340 B2 | 10/2019 | Ye | |
| 10,462,439 B2 | 10/2019 | He | |
| 10,469,847 B2 | 11/2019 | Xiu | |
| 10,638,158 B2 | 4/2020 | Boisson | |
| 10,666,976 B2 | 5/2020 | Huang | |
| 10,687,069 B2 | 6/2020 | Li | |
| 10,887,576 B2 | 1/2021 | Drazic | |
| 11,064,206 B2 | 7/2021 | Zhang | |
| 11,153,562 B2 | 10/2021 | Zhang | |
| 11,317,091 B2 | 4/2022 | Kotra | |
| 11,412,235 B2 | 8/2022 | Li | |
| 11,539,981 B2 | 12/2022 | Zhang | |
| 11,722,667 B2 | 8/2023 | Zhang | |
| 11,778,233 B2 * | 10/2023 | Zhang | .............. H04N 19/119 375/240.03 |
| 11,924,472 B2 | 3/2024 | Deng | |
| 2005/0259730 A1 | 11/2005 | Sun | |
| 2006/0222254 A1 | 10/2006 | Zandi et al. | |
| 2008/0031518 A1 | 2/2008 | Song | |
| 2013/0114694 A1 | 5/2013 | Chen et al. | |
| 2014/0003489 A1 | 1/2014 | Hannuksela | |
| 2014/0219346 A1 | 8/2014 | Ugur et al. | |
| 2015/0264374 A1 | 9/2015 | Xiu | |
| 2015/0264404 A1 | 9/2015 | Hannuksela | |
| 2015/0358631 A1 | 12/2015 | Zhang | |
| 2016/0080751 A1 | 3/2016 | Xiu | |
| 2016/0100168 A1 | 4/2016 | Rapaka | |
| 2016/0100175 A1 | 4/2016 | Laroche | |
| 2016/0261884 A1 | 9/2016 | Li | |
| 2016/0330457 A1 | 11/2016 | Ye | |
| 2016/0360198 A1 * | 12/2016 | Chang | ................... H04N 19/96 |
| 2016/0360205 A1 | 12/2016 | Chang | |
| 2017/0105011 A1 | 4/2017 | Chen | |
| 2017/0150176 A1 * | 5/2017 | Zhang | ................. H04N 19/625 |
| 2017/0318301 A1 * | 11/2017 | Li | ........................ H04N 19/176 |
| 2017/0359595 A1 | 12/2017 | Zhang | |
| 2018/0160126 A1 | 6/2018 | Andersson | |
| 2018/0262776 A1 | 9/2018 | Seifi | |
| 2018/0278967 A1 | 9/2018 | Kerofsky | |
| 2019/0356925 A1 | 11/2019 | Ye | |
| 2019/0379870 A1 | 12/2019 | Ye | |
| 2020/0169732 A1 | 5/2020 | Li | |
| 2020/0244991 A1 | 7/2020 | Li | |
| 2020/0267395 A1 | 8/2020 | Li | |
| 2020/0275111 A1 | 8/2020 | Zhao et al. | |
| 2020/0288172 A1 | 9/2020 | Huang | |
| 2020/0296398 A1 * | 9/2020 | Zhao | ................... H04N 19/124 |
| 2020/0296420 A1 | 9/2020 | Karczewicz et al. | |
| 2020/0396467 A1 * | 12/2020 | Lai | ....................... H04N 19/103 |
| 2022/0070460 A1 | 3/2022 | Ikonin | |
| 2022/0159301 A1 | 5/2022 | Zhang | |
| 2022/0191447 A1 | 6/2022 | Zhang et al. | |
| 2022/0264087 A1 | 8/2022 | Zhang | |
| 2022/0264120 A1 | 8/2022 | Wang | |
| 2022/0368898 A1 | 11/2022 | Zhu | |
| 2022/0394288 A1 | 12/2022 | Li | |

FOREIGN PATENT DOCUMENTS

| | | |
|---|---|---|
| CN | 105960802 A | 9/2016 |
| CN | 106063263 A | 10/2016 |
| CN | 106105203 A | 11/2016 |
| CN | 106254870 A | 12/2016 |
| CN | 106464881 A | 2/2017 |
| CN | 107079150 A | 8/2017 |
| CN | 107079157 A | 8/2017 |
| CN | 109565599 A | 4/2019 |
| CN | 114009024 B | 4/2024 |
| CN | 114041287 B | 10/2024 |
| EP | 3104606 A1 | 12/2016 |
| GB | 2593543 A | 9/2021 |
| JP | 2017005688 A | 1/2017 |
| WO | 2013070703 A1 | 5/2013 |
| WO | 2016040865 A1 | 3/2016 |
| WO | 2016048834 A1 | 3/2016 |
| WO | 2018045332 A1 | 3/2018 |
| WO | 2019006300 A1 | 1/2019 |
| WO | 2019069950 A1 | 4/2019 |
| WO | 2019240539 A1 | 12/2019 |
| WO | 2020009758 A1 | 1/2020 |
| WO | 2020017513 A1 | 1/2020 |

OTHER PUBLICATIONS https://vcgit.hhi.fraunhofer.de/jvet/VVCSoftware_VTM/tags/VTM-5.0, Mar. 10, 2022.
Lu et al. "CE12: Mapping Functions (Test CE12-1 and CE12-2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0427, 2019.
De-Luxian-Hernandez et al. "CE3: Intra Sub-Partitions Coding Mode (Tests 1.1.1 and 1.1.2)," Joint Video Experts Team (JVET) of

(56) References Cited

OTHER PUBLICATIONS

ITU-T SG 16 WP 3 and ISO/IEC JTC 1/SC 29/WG 11 13th Meeting: Marrakech, MA, Jan. 9-18, 2019, document JVET-M0102, 2019.
Pfaff et al. "CE3: Affine Linear Weighted Intra Prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0217, 2019.
Said et al. "CE5: Per-Context CABAC Initialization with Single Window (Test 5.1.4)," Joint Video Experts Team (JVET of ITU-T SG 16 WP 3 and ISO/IEC JTC 1/SC 29/WG 11, 13th Meeting, Marrakech, MA, Jan. 9-18, 2019, documen JVET-M0413, 2019.
"Information Technology—High Efficiency Coding and Media Delivery in Heterogeneous Environments—Part 2: High Efficiency Video Coding" Apr. 20, 2018, ISO/DIS 23008, 4th Edition.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
JEM-7.0: https://jvet.hhi.fraunhofer.de/svn/svn_HMJEMSoftware/tags/ HM-16.6-JEM-7.0, Mar. 10, 2022.
Zhang et al. "Adaptive Color-Space Transform for HEVC Screen Content Coding," 2015 Data Compression Conference.
Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.
Zhao et al. "An Implementation of Adaptive Color Transform in WC," Joint Video Experts Team (JVET) of ITU-T SG of WP 3 and 1SO/IEC JTC 1/SC 29/WG 11 14th Meeting: Geneva, CH, Mar. 19-27, 2019, document JVET-N0368, 2019.
Xiu et al. "Support of Adaptive Color Transform for 444 Video Coding in WC," Joint Video Experts Team (JVET) of ITU-T SG 16 WP 3 and 1SO/IEC JTC 1/SC 29/WG 11 16th Meeting: Geneva, CH, Oct. 1-11, 2019, document JVET-P0517, 2019.
Karczewicz et al. "JVET AHG Report: Tool Evaluation (AHG1)," Joint Video Exploration Team (JVET) of ITU-T SG 16 WP 3 and ISO/IEC JTC 1/SC 29/WG 11 8th Meeting: Macao, CN, Oct. 18-25, 2017, document JVET-H0001, 2017.
He et al. "AHG12: On Top-to-Bottom Tile Partitioning," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0066, 2019.
Marpe et al. "An Adaptive Color Transform Approach and its Application in 4:4:4 Video Coding," 14th European Signal Processing Conference (EUSIPCO 2006), Florence Italy, Sep. 4-8, 2006.
Zhang et al. "Adaptive Color-Space Transform in HEVC Screen Content Coding," IEEE Journal on Emerging and Selected Topics in Circuits and Systems, 2016.
Zhang et al. "Non-CE: Unsymmetrical Quadtree Partitioning," Joint Video Experts Team (JVET) of ITU-T SG 16 WP 3 and ISO/IEC JTC 1/SC 29/WG 1114th Meeting: Geneva, CH, Mar. 19-27, 2019, document JVET-N0421, 2019.
Notice of Allowance from U.S. Appl. No. 17/737,260 dated Jan. 9, 2023.
International Search Report and Written Opinion from International Patent Application No. PCT/CN2020/097368 dated Sep. 24, 2020 (10 pages).
International Search Report and Written Opinion from International Patent Application No. PCT/CN2020/097370 dated Sep. 27, 2020 (10 pages).
International Search Report and Written Opinion from International Patent Application No. PCT/CN2020/097372 dated Aug. 18, 2020 (10 pages).
International Search Report and Written Opinion from International Patent Application No. PCT/CN2020/126962 dated Feb. 1, 2021 (15 pages).
Notice of Allowance from U.S. Appl. No. 17/556,689 dated Aug. 10, 2022.

Non Final Office Action from U.S. Appl. No. 17/737,260 dated Aug. 31, 2022.
Non Final Office Action from U.S. Appl. No. 17/556,689 dated Mar. 24, 2022.
Chinese Notice of Allowance from Chinese Patent Application No. 202080045542.4 dated Jul. 29, 2024, 6 pages.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11 7th Meeting: Torino, IT, Jul. 2017, pp. 1-50.
Document: JVET-O0122-v2, Karczewicz, M., et al., "CE7: Sign context, level mapping, and bitplane coding for TS residual coding (CE7-3.7, CE7-3.8, CE7-3.9, CE7-3.10, and CE7-3.11)," Joint Video Experts Team (JVET) of ITU-T SG 16 WP 3 and ISO/IEC JTC 1/SC 29/WG 11 15th Meeting: Gothenburg, SE, 312 Jul. 2019, 22 pages.
Document: JVET-O0122-v3, Karczewicz, M., et al., "CE7: Sign context, level mapping, and bitplane coding for TS residual coding (CE7-3.7, CE7-3.8, CE7-3.9, CE7-3.10, and CE7-3.11)," Joint Video Experts Team (JVET) of ITU-T SG 16 WP 3 and ISO/IEC JTC 1/SC 29/WG 11 15th Meeting: Gothenburg, SE, 312 Jul. 2019, 27 pages.
Document: JVET-P2001-v3, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 15 pages.
Document: JVET-Q0117-v1, Wang, Y.K., et al., "AHG9: Cleanups on parameter sets," Joint Video Experts Team (JVET) of ITU-T SG 16 WP 3 and ISO/IEC JTC 1/SC 29/WG 11 17th Meeting: Brussels, BE, 717 Jan. 2020, 9 pages.
Document: JVET-Q2001-v9, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 17 pages.
Document: JVET-R0070-v1, Wang, Y.K., et al., "AHG9: On repetition and update of non-VCL data units," Joint Video Experts Team (JVET) of ITU-T SG 16 WP 3 and ISO/IEC JTC 1/SC 29/WG 11 18th Meeting: by teleconference, 1524 Apr. 2020, 4 pages.
Final Office Action from U.S. Appl. No. 17/955,719 dated Mar. 29, 2024.
Final Office Action from U.S. Appl. No. 18/472,093 dated Sep. 13, 2024, 16 pages.
Foreign Communication From A Related Counterpart Application, European Application No. 21781004.3, Partial Supplementary European Search Report dated Jun. 23, 2023, 14 pages.
Foreign Communication From a Related Counterpart Application, PCT Application No. PCT/CN2021/084869, English Translation of International Search Report dated Jun. 25, 2021, 12 pages.
Foreign Communication From a Related Counterpart Application, PCT Application No. PCT/CN2021/084870, English Translation of International Search Report dated Jun. 30, 2021, 13 pages.
ITU-T "Series H: Audiovisual and Multimedia Systems Infrastructure of audiovisual services—Coding of moving video; High efficiency video coding," Rec. ITU-T H.265 | ISO/IEC 23008-2 (in force edition), Nov. 2019, 712 pages.
Japanese Office Action from Japanese Application No. 2022-559412 dated Apr. 9, 2024, 16 pages. With English Translation.
Japanese Office Action from Japanese Patent Application No. 2022-559412 dated Sep. 17, 2024, 7 pages.
JCTVC-J0072r1, Hannuksela, M., et al., "AHG9 High-Level Syntax: APS loss detection," Joint Collaborative Team on Video Coding (JCT-VC) of ITU-T SG 16 WP 3 and ISO/IEC JTC 1/SC 29/WG 11 10th Meeting: Stockholm, SE, Jul. 11-20, 2012, 4 pages.
JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
JVET-N0280, Bross, B., et al., "CE8: Residual Coding for Transform Skip Mode (CE8-4.3a, CE8-4.3b, CE8-4.4a, and CE8-4.4b)," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.

(56) References Cited

OTHER PUBLICATIONS

JVET-N1001-v1, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 350 pages.

JVET-O0081-v2, Tsukuba, T., et al., "CE8: Chroma Transform Skip (CE8-3.2)," Joint Video Experts Team (JVET) of ITU-T SG 16 WP 3 and ISO/IEC JTC 1/SC 29/WG 11 15th Meeting: Gothenburg, SE, Jul. 3-12, 2019, 10 pages.

JVET-O0246-v1, Seregin, V., et al., "AHG17: Separate luma and chroma Alf Aps types," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.

JVET-O0512, Keating, S., et al., "Non-CE3: CCLM Coding bug fix," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.

JVET-O0556, Karczewicz, M., et al., "CE7-related: Alternative method to RDPCM with TS level mapping," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.

JVET-P0437-r1, Karczewicz, M., et al., CE7: Sign context, level mapping, and bitplane coding for TS residual coding (CE7-3.7, CE7-3.8, CE7-3.9, CE7-3.10, and CE7-3.11), Joint Video Experts Team (JVET) of ITU-T SG 16 WP 3 and ISO/IEC JTC 1/SC 29/WG 11 15th Meeting: Gothenburg, SE, Jul. 3-12, 2019, 22 pages.

JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.

Non-Final Office Action from U.S. Appl. No. 17/955,719 dated Apr. 27, 2023, 18 pages.

Non-Final Office Action from U.S. Appl. No. 18/472,093 dated May 14, 2024, 30 pages.

Non-Final Office Action from U.S. Appl. No. 18/517,737 dated Jun. 18, 2024, 21 pages.

Suehring, K., VTM software: https://vcgit.hhi.fraunhofer.de/jvet/VVCSoftware_VTM.git, Dec. 20, 2022, 3 pages.

Notice of Allowance for U.S. Appl. No. 18/321,426, mailed Dec. 20, 2024, 20 pages.

Notice of Allowance from U.S. Appl. No. 18/321,426 dated Dec. 20, 2024, 20 pages.

\* cited by examiner

SELECTIVE USE OF ADAPTIVE IN-LOOP COLOR-SPACE TRANSFORM AND OTHER VIDEO CODING TOOLS

CROSS REFERENCE TO RELATED APPLICATIONS

This application is a continuation application of U.S. patent application Ser. No. 17/556,769, filed on Dec. 20, 2021, which is a continuation of International Patent Application No. PCT/CN2020/097370, filed on Jun. 22, 2020, which claims the priority to and benefits of International Patent Application PCT/CN2019/092326, filed on Jun. 21, 2019. All the aforementioned patent applications are hereby incorporated by reference in their entireties.

TECHNICAL FIELD

This patent document is directed generally to video coding and decoding technologies.

BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the next generation Versatile Video Coding (VVC) standard targeting at 50% bitrate reduction compared to HEVC.

SUMMARY

Using the disclosed video coding, transcoding or decoding techniques, embodiments of video encoders or decoders can handle virtual boundaries of coding tree blocks to provide better compression efficiency and simpler implementations of coding or decoding tools.

In one example aspect, a method of video processing is disclosed. The method includes determining, due to a dual tree partitioning structure being used for a conversion between a video unit and a coded representation of the video unit, that use of an adaptive color space transformation (ACT) tool is disabled for the video unit; and performing, based on the determining, the conversion by disabling the ACT tool for the video unit, wherein the use of the ACT tool comprises: converting, during encoding, a representation of a visual signal from a first color domain to a second color domain, or converting, during decoding, a representation of a visual signal from the second color domain to the first color domain.

In another example aspect, another method of video processing is disclosed. The method includes determining that a dual tree partitioning structure and an adaptive color space transformation (ACT) tool are used for a conversion between a video unit and a coded representation of the video unit; and performing, based on the determining, the conversion by enabling the ACT tool for the video unit, wherein use of the ACT tool comprises: converting, during encoding, a representation of a visual signal from a first color domain to a second color domain, or converting, during decoding, a representation of a visual signal from the second color domain to the first color domain.

In another example aspect, another method of video processing is disclosed. The method includes determining, for a conversion between a current video block of a video and a coded representation of the video, that applicability of a first coding tool and a second coding tool is mutually exclusive; and performing the conversion based on the determining, wherein the first coding tool corresponds to an adaptive color space transformation (ACT) tool; wherein use of the ACT tool comprises: converting, during encoding, a representation of a visual signal from a first color domain to a second color domain, or converting, during decoding, a representation of a visual signal from the second color domain to the first color domain.

In another example aspect, another method of video processing is disclosed. The method includes determining that both a coding tool and an adaptive color space transformation (ACT) tool are used for a conversion between a current video block of a video and a coded representation of the video; and performing, based on the determining, the conversion by enabling the ACT tool for the current video block, wherein use of the ACT tool comprises: converting, during encoding, a representation of a visual signal from a first color domain to a second color domain, or converting, during decoding, a representation of a visual signal from the second color domain to the first color domain.

In another example aspect, another method of video processing is disclosed. The method includes determining, for a conversion between a current video block of a video unit of a video and a coded representation of the video, that an adaptive color space transformation (ACT) tool is disabled for the conversion due to an in-loop reshaping (ILR) tool being enabled for the video unit; and performing, based on the determining, the conversion, and wherein the use of the ILR tool includes constructing the video unit based on a luma reshaping between a first domain and a second domain and/or a chroma residue scaling in a luma-dependent manner, and wherein use of the ACT tool comprises: converting, during encoding, a representation of a visual signal from a first color domain to a second color domain, or converting, during decoding, a representation of a visual signal from the second color domain to the first color domain.

In another example aspect, another method of video processing is disclosed. The method includes determining that both an in-loop reshaping (ILR) tool and an adaptive color space transformation (ACT) tool are enabled for a conversion between a video unit and a coded representation of the video unit; and performing, based on the determining, the conversion, and wherein use of the ILR tool includes constructing the current video unit based on a first domain and a second domain and/or scaling chroma residue in a luma-dependent manner, and wherein use of the ACT tool comprises: converting, during encoding, a representation of a visual signal from a first color domain to a second color domain, or converting, during decoding, a representation of a visual signal from the second color domain to the first color domain.

In another example aspect, another method of video processing is disclosed. The method includes determining that both a sub-block transform (SBT) tool and an adaptive color space transformation (ACT) coding tool are enabled for a conversion between a current video block and a coded representation of the current video block; and performing, based on the determining, the conversion, wherein use of the SBT tool comprises applying a transform process or an inverse transform process on a sub-part of a prediction residual block, and wherein use of the ACT tool comprises: converting, during encoding, a representation of a visual signal from a first color domain to a second color domain, or converting, during decoding, a representation of a visual signal from the second color domain to the first color domain.

In another example aspect, another method of video processing is disclosed. The method includes performing a conversion between a video unit of a video and a coded representation of the video, where the video unit comprises one or more partitions at a first level comprising one or more partitions at a second level, wherein the coded representation conforms to a formatting rule, wherein the formatting rule specifies whether to include, or a partition level at which a syntax element indicative of use of an adaptive color space transformation (ACT) tool for representing the one or more second level partitions in the coded representation is included in the coded representation, wherein the partition level is one of the first level, the second level or the video unit.

In yet another example aspect, a video encoding apparatus configured to perform an above-described method is disclosed.

In yet another example aspect, a video decoder that is configured to perform an above-described method is disclosed.

In yet another example aspect, a machine-readable medium is disclosed. The medium stores code which, upon execution, causes a processor to implement one or more of the above-described methods.

The above and other aspects and features of the disclosed technology are described in greater detail in the drawings, the description and the claims.

DETAILED DESCRIPTION

Figure 1:
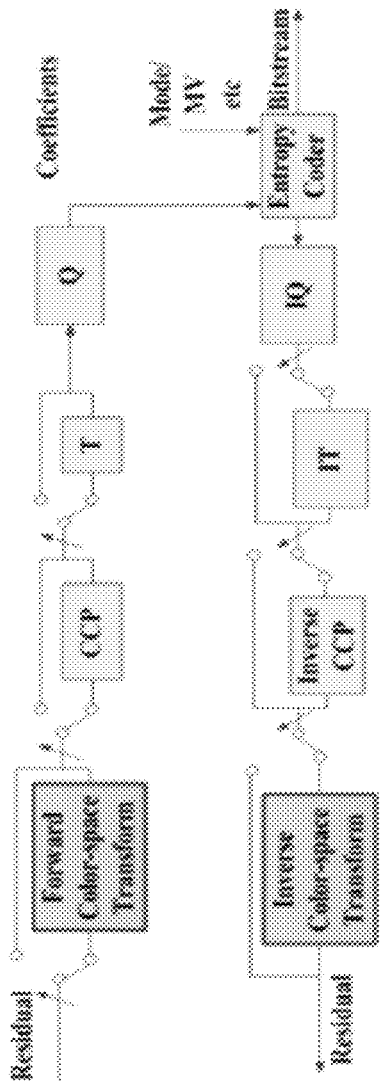
FIG. 1 shows an example of encoding flow with adaptive color-space transform (ACT).

Section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This document is related to video coding technologies. Specifically, it is related to interactions of adaptive colorspace transform with other tools in video coding. It may be applied to the existing video coding standard like HEVC, or the standard (Versatile Video Coding) to be finalized. It may be also applicable to future video coding standards or video codec.

2. Background

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 5) could be found at:
http://phenix.it-sudparis.eu/jvet/doc_end_user/documents/14_Genev a/wg11/JVET-N1001-v2.zip The latest reference software of VVC, named VVC test model (VTM), could be found at: https://vcgit.hhi.fraunhofer.de/jvet/VVCSoftware_VTM/tags/VTM-5.0

2.1. Adaptive color-space transform (ACT) in HEVC Screen Content Coding Extensions In the HEVC SCC Extensions, several tools have been proposed and employed to improve the SCC efficiency under the HEVC framework. For example, to exploit the repeated patterns in SC, an intra block copying (IBC) scheme was adopted. Similar to the motion compensation scheme used for inter pictures, the IBC mode searches for the repeated patterns in the already reconstructed region of the current picture. Another direction to improve SCC is to reduce the inter-color-component redundancy for the RGB/luma, blue difference chroma, red difference chroma (YCbCr) sequences in the 4:4:4 chroma format.

The cross-component prediction (CCP) technology signals a weighting parameter index for each chroma color component of a transform unit. CCP provides good coding efficiency improvements with limited added complexity and thus, it was adopted to the HEVC Range Extensions and is part of HEVC Ver. 2 which specifies descriptions of Range Extensions, and other Extensions.

In order to further exploit inter-color-components correlation for SCC, an in-loop adaptive color-space transform (ACT) for HEVC SCC Extensions was employed. The basic idea of ACT is to adaptively convert the prediction residual into a color space with reduced redundancy among the three-color components. Before and after that, the signal follows the existing coding path in HEVC Range Extensions. To keep the complexity as low as possible, only one additional color-space (i.e., RGB to YCgCo-R inverse transform) is considered, which can be easily implemented with shift and add operations.

2.1.1. Transforms used in ACT

For lossy coding, the YCgCo transform is used while its reversible variant, i.e., YCgCo-R, is used for lossless coding.

The forward and inverse YCgCo transform process is listed as below: taking a pixel in (R, G, B) color format as an example:

$$\text{Forward:} \begin{bmatrix} Y \\ Cg \\ Co \end{bmatrix} = \frac{1}{4} * \begin{bmatrix} 1 & 2 & 1 \\ -1 & 2 & -1 \\ 2 & 0 & -2 \end{bmatrix} \begin{bmatrix} R \\ G \\ B \end{bmatrix}$$

$$\text{Inverse:} \begin{bmatrix} R \\ G \\ B \end{bmatrix} = \begin{bmatrix} 1 & -2 & 1 \\ 1 & 1 & 0 \\ 1 & -1 & -1 \end{bmatrix} \begin{bmatrix} Y \\ Cg \\ Co \end{bmatrix}$$

Different from YCgCo transform which could be implemented by a matrix multiplication, the reversible color-space transform, i.e., YCgCo-R, used in ACT can only be performed in lifting-based operation as follows:

$$\text{Forward:} \begin{array}{l} Co = R - B \\ t = B + (Co \gg 1) \\ Cg = G - t \\ Y = t + (Cg \gg 1) \end{array}$$

$$\text{Inverse:} \begin{array}{l} t = Y - (Cg \gg 1) \\ G = Cg + t \\ B = t - (Co \gg 1) \\ R = Co + b \end{array}$$

2.1.2. Usage of ACT

For each TU, a flag may be signaled to indicate the usage of color-space transform. In addition, for intra coded CUs, ACT is enabled only when the chroma and luma intra prediction modes are the same, i.e., the chroma block is coded with DM mode.

Figure 2:
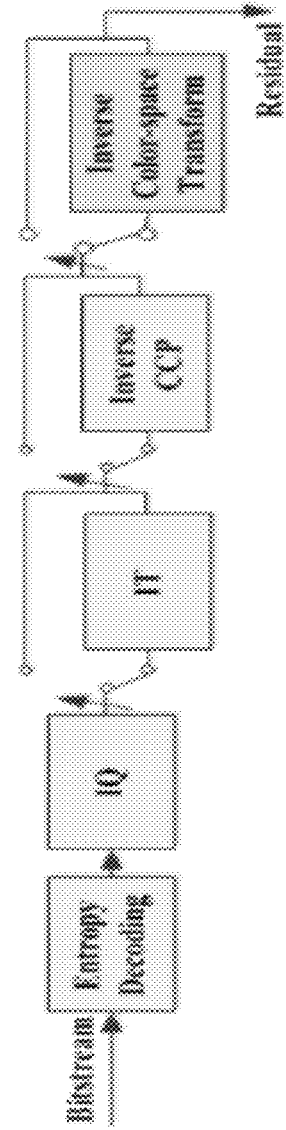
FIG. 2 shows an example of a decoding flow with ACT.

FIG. 1 shows the block diagram of the proposed method at the encoder with the residual signal derived from intra/inter prediction as the input. The proposed function blocks, including forward and reverse color-space transforms, are located in the coding loop and highlighted. As shown in FIG. 1, after the intra- or inter-prediction process (including the prediction process for IBC mode), it is determined whether to perform the forward color-space transform. With the introduced color-space transform, the color space of the input signal may be converted to YCgCo with less correlation among the three-color components. After that, the original coding flow, such as CCP, integer transform (i.e., T in FIG. 1), if applicable, quantization (i.e., Q in FIG. 1) and entropy coding processes, is further invoked in order. Meanwhile, during the reconstruction or decoding process as depicted in FIG. 2, after the conventional inverse quantization (i.e., IQ in FIG. 2), inverse transform (i.e., IT in FIG. 2) and inverse CCP, if applicable, the inverse color transform is invoked to convert the coded residual back to the original color space. It should be noted that, the color-space conversion process is applied to the residual signal instead of the reconstruction signal. With such a method, the decoder only needs to perform the inverse color space transform process which could keep the complexity increase as low as possible. Furthermore, in ACT, fixed color space transforms, i.e., YCgCo and YCgCo-R, are utilized regardless of input color spaces.

2.2. Local Illumination Compensation in JEM

Local Illumination Compensation (LIC) is based on a linear model for illumination changes, using a scaling factor a and an offset b. And it is enabled or disabled adaptively for each inter-mode coded coding unit (CU).

Figure 3:
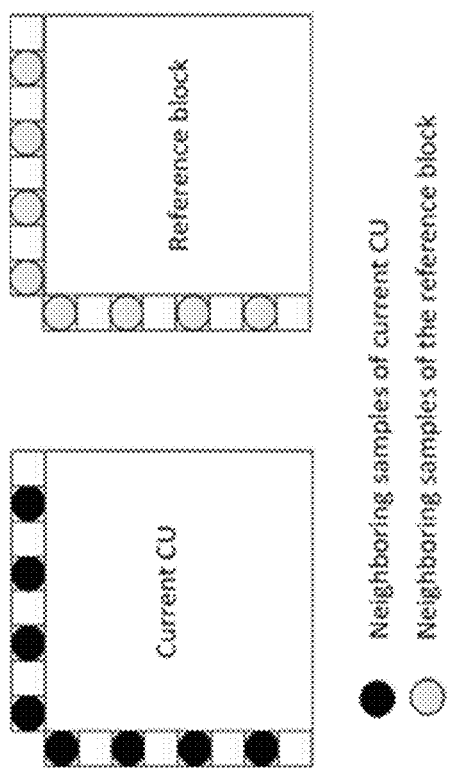
FIG. 3 shows an example of neighbouring samples used for deriving illumination compensation (IC) parameters.

When LIC applies for a CU, a least square error method is employed to derive the parameters a and b by using the neighbouring samples of the current CU and their corresponding reference samples. More specifically, as illustrated in FIG. 3, the subsampled (2:1 subsampling) neighbouring samples of the CU and the corresponding samples (identified by motion information of the current CU or sub-CU) in the reference picture are used.

2.2.1. Derivation of Prediction Blocks

The IC parameters are derived and applied for each prediction direction separately. For each prediction direction, a first prediction block is generated with the decoded motion information, then a temporary prediction block is obtained via applying the LIC model. Afterwards, the two temporary prediction blocks are utilized to derive the final prediction block.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level rate distortion (RD) check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.3. Inter Prediction Methods in VVC

There are several new coding tools for inter prediction improvement, such as Adaptive motion vector difference resolution (AMVR) for signaling motion vector difference (MVD), affine prediction mode, Triangular prediction mode (TPM), Advanced. Temporal Motion Vector Prediction (ATMVP), Generalized Bi-Prediction (GBI), Bi-directional Optical flow (BIO).

2.3.1. Coding Block Structure in VVC

In VVC, a Quad-Tree/Binary-Tree/Ternary Tree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

2.4. In-Loop Reshaping (ILR) in JVET-M0427

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT $[Y_i]$. The other LUT is an inverse LUT, InvLUT, that maps altered code values $Y_r$ to $\hat{Y}_i$: $\hat{Y}_i$=InvLUT $[Y_r]$. ($\hat{Y}_i$ represents the reconstruction values of $Y_i$).

2.4.1. PWL Model

Conceptually, piece-wise linear (PWL) is implemented in the following way:

Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2^{FP\_PREC-1})>>FP\_PREC)+c$$

where m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without precomputing the LUTs.

2.4.2. Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 4:
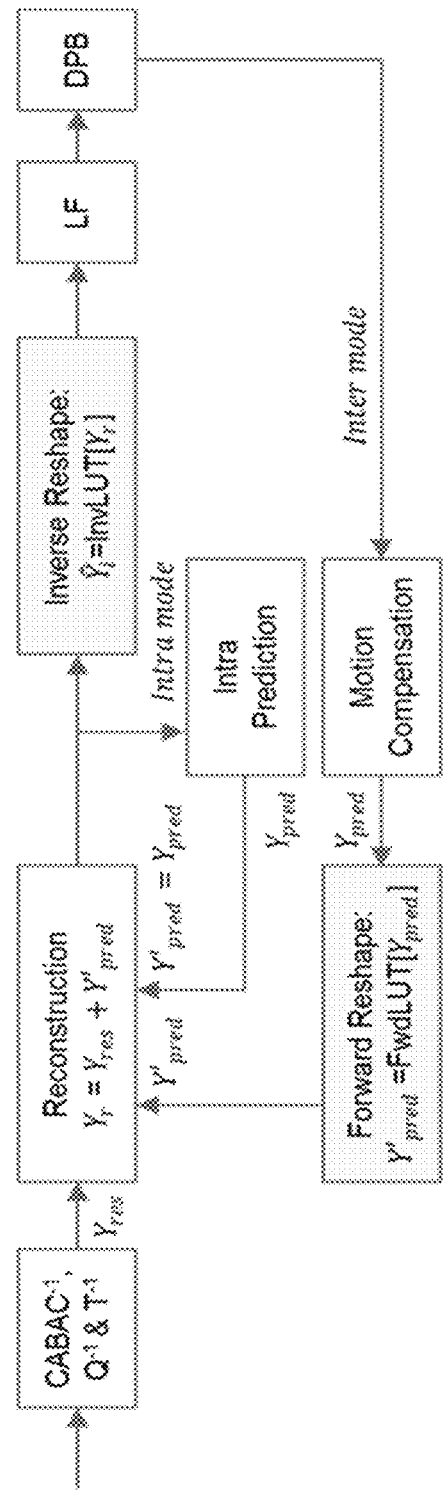
FIG. 4 shows an example flowchart of decoding flow with reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 4 shows the block diagram of the CE12-2 decoding process based on mode.

CE12-2 also tests 16-piece piece-wise linear (PWL) models for luma and chroma residue scaling instead of the 32-piece PWL models of CE12-1.

FIG. 4 shows a flowchart of decoding flow with reshaping.

Inter slice reconstruction with in-loop luma reshaper in CE12-2 (light-green shaded blocks indicate signal in reshaped domain: luma residue; intra luma predicted; and intra luma reconstructed)

2.4.3. Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.
For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values 2.4.3.1. Signalling of ILR Side Information The parameters are (currently) sent in the tile group header (similar to adaptive loop filter (ALF)). These reportedly take 40-100 bits.

2.4.3.2. Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual is generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:
  Current block is intra-coded
  Current block is coded as CPR (current picture referencing, aka intra block copy, IBC)—
  Current block is coded as combined inter-intra mode (CIIP) and the forward reshaping is disabled for the intra prediction block 2.5. Virtual Pipelining Data Units (VPDU)

Virtual pipeline data units (VPDUs) are defined as non-overlapping M×M-luma (L)/N×N-chroma(C) units in a picture. In hardware decoders, successive VPDUs are processed by multiple pipeline stages at the same time; different stages process different VPDUs simultaneously. The VPDU size is roughly proportional to the buffer size in most pipeline stages, so it is said to be very important to keep the VPDU size small. In HEVC hardware decoders, the VPDU size is set to the maximum transform block (TB) size. Enlarging the maximum TB size from 32×32-L/16×16-C (as in HEVC) to 64×64-L/32×32-C (as in the current VVC) can bring coding gains, which results in 4× of VPDU size (64×64-L/32×32-C) expectedly in comparison with HEVC. However, in addition to quadtree (QT) coding unit (CU) partitioning, ternary tree (TT) and binary tree (BT) are adopted in VVC for achieving additional coding gains, and TT and BT splits can be applied to 128×128-L/64×64-C coding tree blocks (CTUs) recursively, which is said to lead to 16× of VPDU size (128×128-L/64×64-C) in comparison with HEVC.

In current design of VVC, the VPDU size is defined as 64×64-L/32×32-C.

2.6. Multiple Reference Line (MRL)

Figure 5:
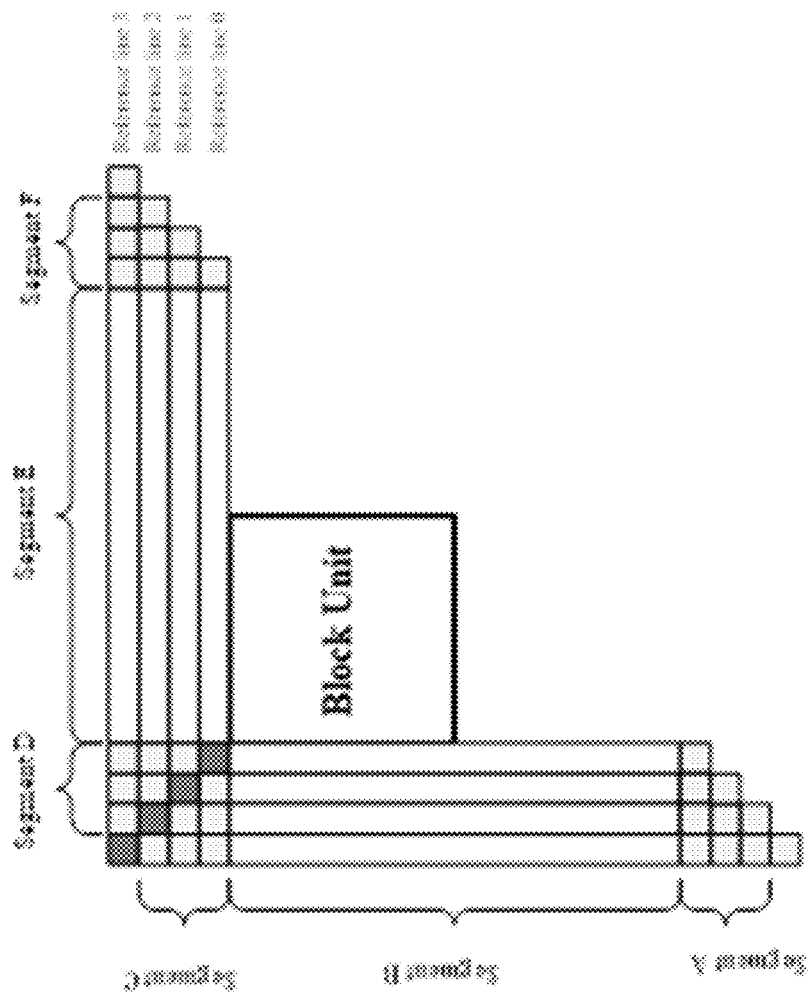
FIG. 5 is a reference line example.

Multiple reference line (MRL) intra prediction uses more reference lines for intra prediction. In FIG. 5, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in most probable mode (MPM) list and only signal MPM index without remaining mode. The reference line index is signaled before intra prediction modes, and Planar and direct current (DC) modes are excluded from intra prediction modes in case a nonzero reference line index is signaled.

FIG. 5 is an example of four reference lines neighboring to a prediction block.

MRL is disabled for the first line of blocks inside a CTU to prevent using extended reference samples outside the current CTU line. Also, Position Dependent Prediction Combination (PDPC) is disabled when additional line is used.

2.7. Intra Subblock Partitioning (ISP)

Figure 6:
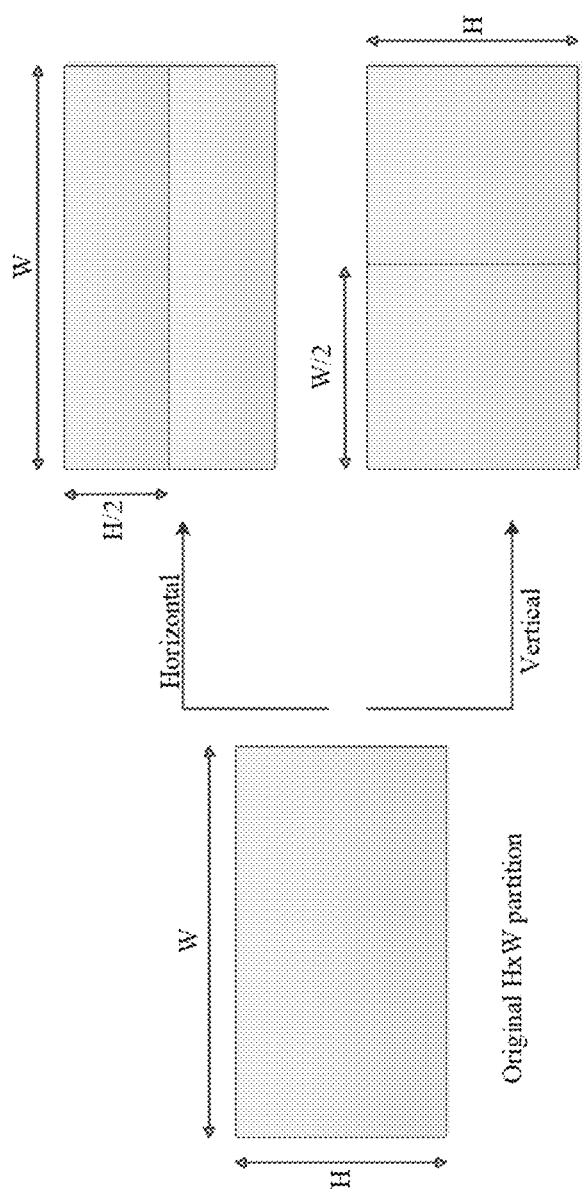
FIG. 6 shows example of division of 4×8 and 8×4 blocks.
Figure 7:
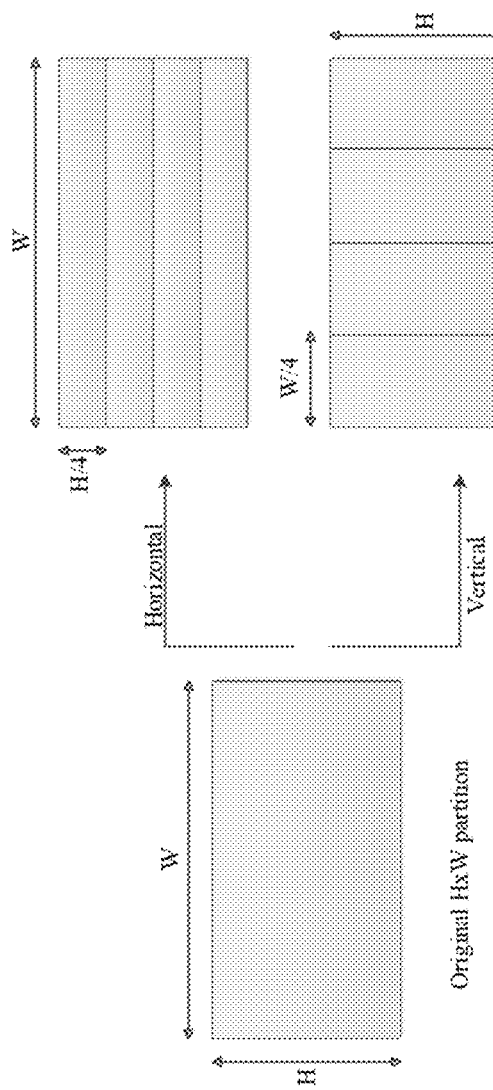
FIG. 7 shows an example of division of all blocks except 4×8, 8×4 and 4×4.
Figure 8:
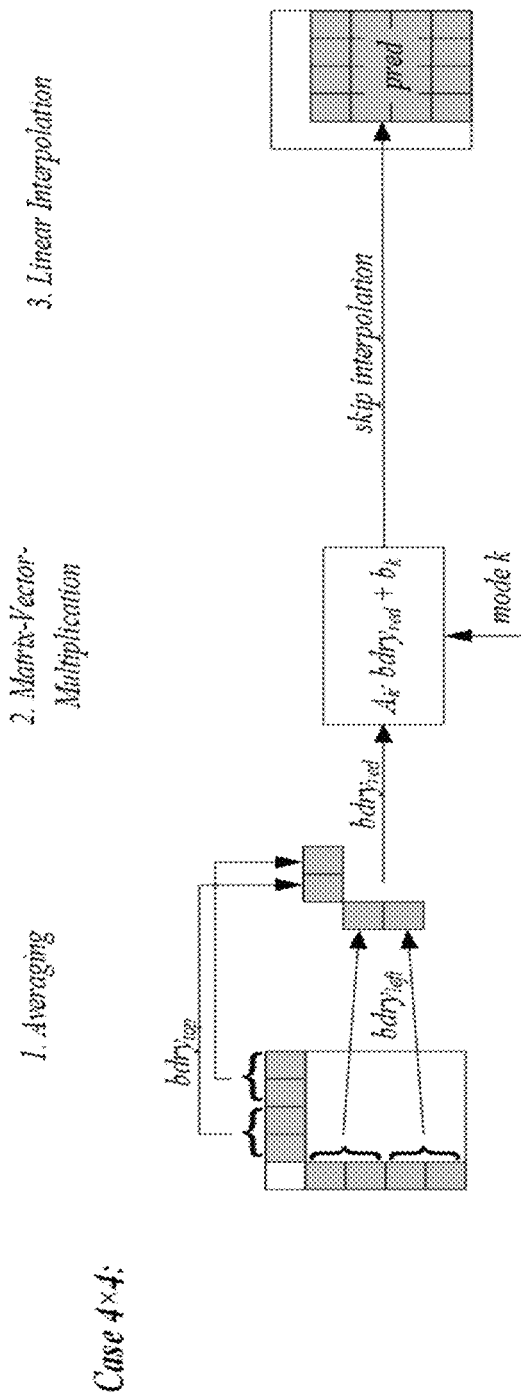
FIG. 8 is an illustration of affine linear weighted intra prediction (ALWIP) for 4×4 blocks.
Figure 9:
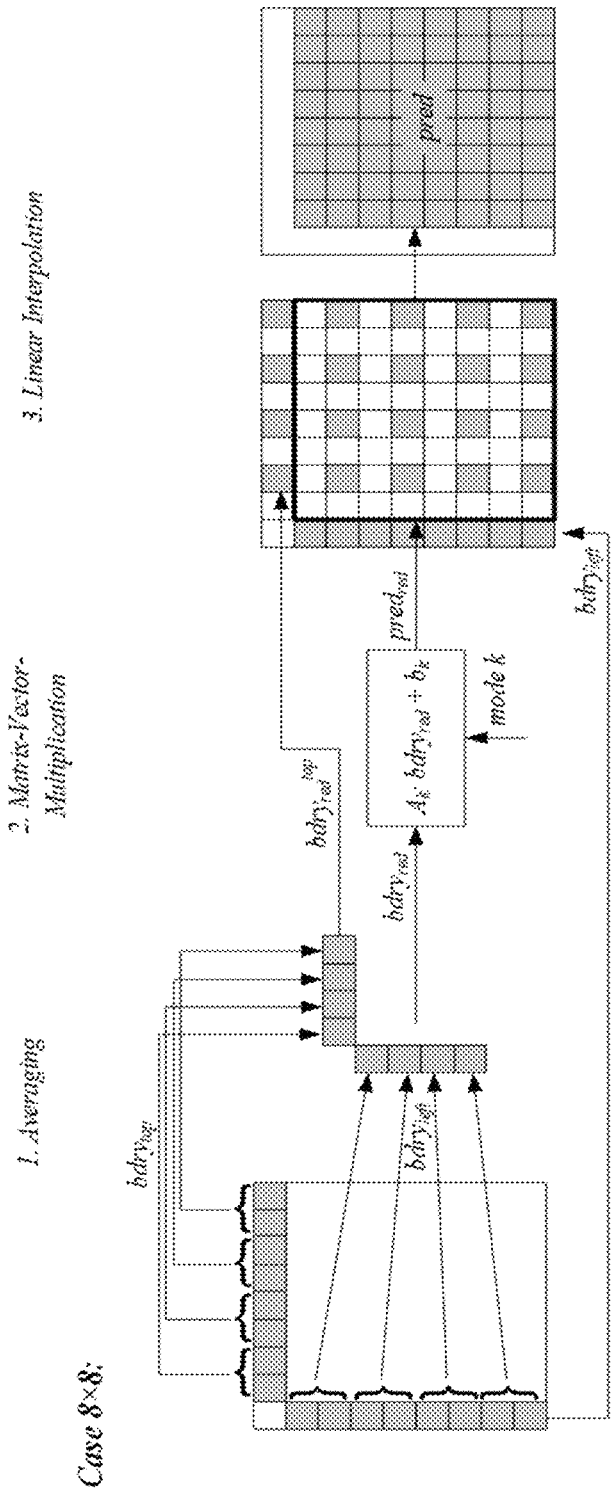
FIG. 9 is an illustration of ALWIP for 8×8 blocks.
Figure 10:
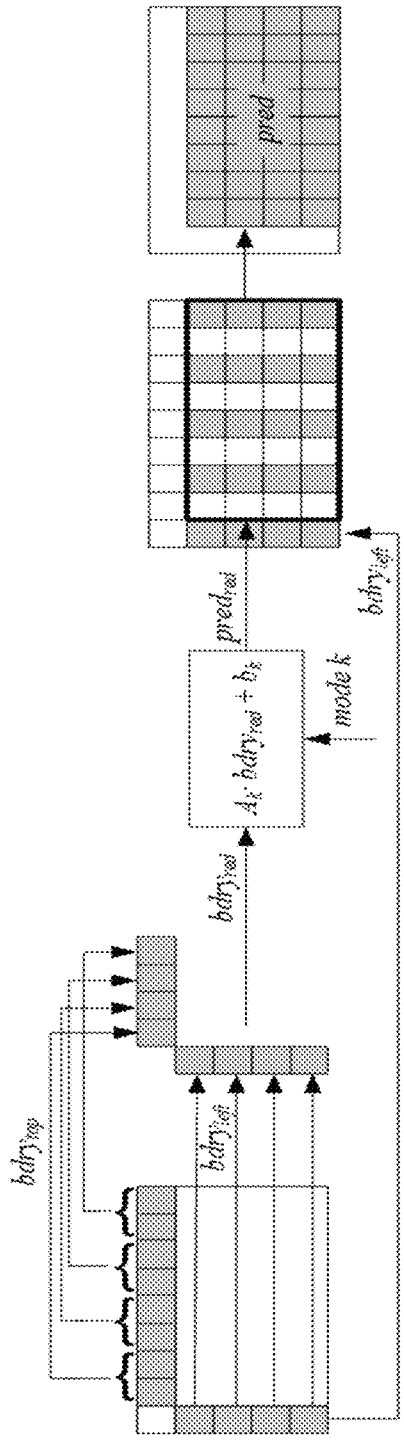
FIG. 10 is an illustration of ALWIP for 8×4 blocks.
Figure 11:
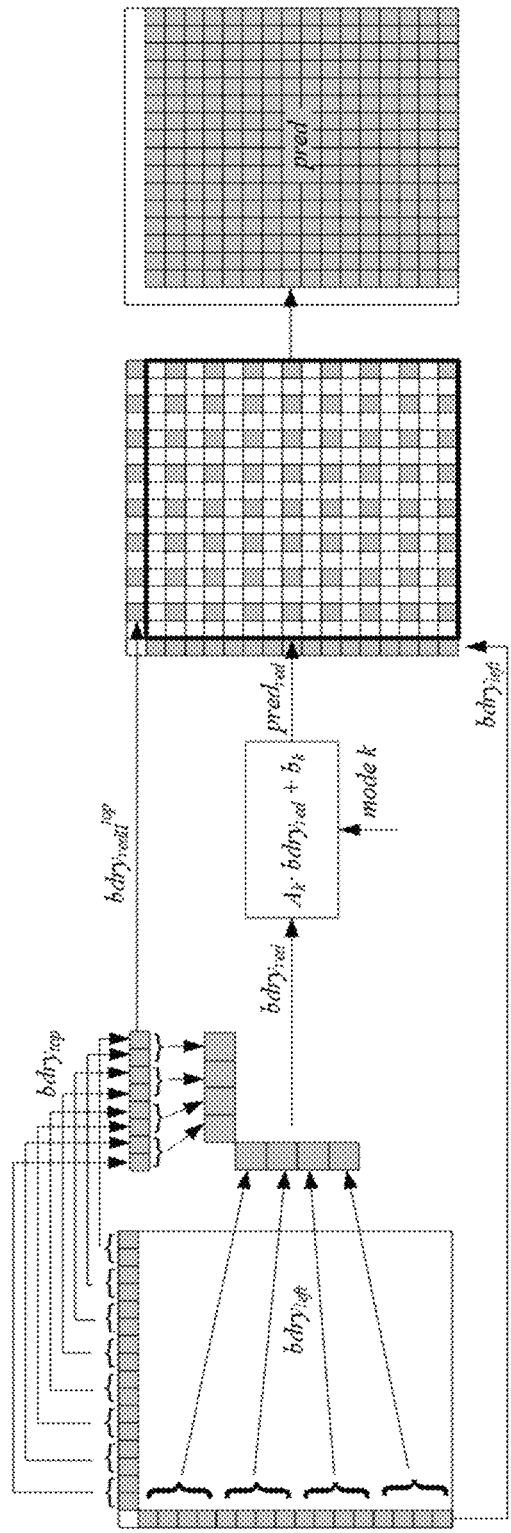
FIG. 11 is an illustration of ALWIP for 16×16 blocks.

In JVET-M0102, ISP is proposed, which divides luma intra-predicted blocks vertically or horizontally into 2 or 4 sub-partitions depending on the block size dimensions, as shown in Table 1. FIG. 6 and FIG. 7 show examples of the two possibilities. All sub-partitions fulfill the condition of having at least 16 samples. For block sizes, 4×N or N×4 (with N>8), if allowed, the 1×N or N×1 sub-partition may exist.

TABLE 1

Number of sub-partitions depending on the block size
(denoted maximum transform size by maxTBSize)

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTBSize | 4 |
| Horizontal | If not above cases and H > maxTBSize | 4 |
| Vertical | If not above cases and H > maxTBSize | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Hereinafter, inner sub-partition is used to represent sub-partitions except the first sub-partition. If an ISP block is split in horizontal (vertical) direction, the first sub-partition means the above (left) sub-partition.

TABLE 2

Specification of trTypeHor and trTypeVer
depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | (nTbW >= 4 && nTbW <= 16) ? DST-VII:DCT-II | (nTbH >= 4 && nTbH <= 16) ? DST-VII:DCT-II |
| INTRA_ANGULAR33, INTRA_ANGULAR35 | DCT-II | DCT-II |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | (nTbW >= 4 && nTbW <= 16) ? DST-VII:DCT-II | DCT-II |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | DCT-II | (nTbH >= 4 && nTbH <= 16) ? DST-VII:DCT-II |

2.8. Affine Linear Weighted Intra Prediction (ALWIP, a.k.a. Matrix Based Intra Prediction)

Affine linear weighted intra prediction (ALWIP), a.k.a. Matrix based intra prediction (MIP) is proposed in JVET-N0217.

2.8.1. Generation of the Reduced Prediction Signal by Matrix Vector Multiplication The neighboring reference samples are firstly down-sampled via averaging to generate the reduced reference signal $bdry_{red}$. Then, the reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

2.8.2. Illustration of the Entire ALWIP Process

The entire process of averaging, matrix vector multiplication and linear interpolation is illustrated for different shapes in FIG. 8, FIG. 9, FIG. 10 and FIG. 11. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.

The transposed case is treated accordingly.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical position.

Finally, for W×4 blocks with W>8, let $A_k$ be the matrix that arises by leaving out every row that corresponds to an odd entry along the horizontal axis of the down-sampled block. Thus, the output size is 32 and again, only horizontal interpolation remains to be performed. The transposed cases are treated accordingly.

2.8.3. Adapted MPM-List Derivation for Conventional Luma and Chroma Intra-Prediction Modes The proposed ALWIP-modes are harmonized with the MPM-based coding of the conventional intra-prediction modes as follows. The luma and chroma MPM-list derivation processes for the conventional intra-prediction modes uses fixed tables map_alwip_to_angular$_{idx}$, idx∈{0,1,2}, mapping an ALWIP-mode predmode$_{ALWIP}$ on a given prediction unit (PU) to one of the conventional intra-prediction modes predmode$_{Angular}$=map_alwip_to_angular$_{idx(PU)}$[predmode$_{ALWIP}$].

predmode$_{Angular}$=map_alwip_to_angular$_{idx(PU)}$[predmode$_{ALWIP}$]

For the luma MPM-list derivation, whenever a neighboring luma block is encountered which uses an ALWIP-mode predmode$_{ALWIP}$, this block is treated as if it was using the conventional intra-prediction mode predmode$_{Angular}$. For the chroma MPM-list derivation, whenever the current luma block uses an LWIP-mode, the same mapping is used to translate the ALWIP-mode to a conventional intra prediction mode.

2.9. Quantized Residual Block Differential Pulse-Code Modulation (QR-BDPCM)

In JVET-M0413, a quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the the predicted block line by line) or vertically (copying top neighbor line to each line in the predicted block) using unfiltered samples from above or left block boundary samples. Let Q ($r_{i,j}$), $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i=0, 0 \leq j \leq (N-1) \\ Q(r_{i,j}) - Q(r_{(i-1),j}), & 1 \leq i \leq (M-1), 0 \leq j \leq (N-1) \end{cases} \quad (2\text{-}7\text{-}1)$$

For horizontal prediction, similar rules apply, and the residual quantized samples are obtained by $$\tilde{r}_{i,j} = \begin{cases} Q(r_{i,j}), & 0 \leq i \leq (M-1), j=0 \\ Q(r_{i,j}) - Q(r_{i,(j-1)}), & 0 \leq i \leq (M-1), 1 \leq j \leq (N-1) \end{cases} \quad (2\text{-}7\text{-}2)$$

The residual quantized samples $\tilde{r}_{i,j}$ are sent to the decoder.

On the decoder side, the above calculations are reversed to produce $Q(r_{i,j})$ $0 \leq i \leq M-1$, $0 \leq j \leq N-1$. For vertical prediction case, $$Q(r_{i,j}) = \sum_{k=0}^{i} \tilde{r}_{k,j}, 0 \leq i \leq (M-1), 0 \leq j \leq (N-1) \quad (2\text{-}7\text{-}3)$$

For horizontal case, $$Q(r_{i,j}) = \sum_{k=0}^{j} \tilde{r}_{i,k}, 0 \leq i \leq (M-1), 0 \leq j \leq (N-1) \quad (2\text{-}7\text{-}4)$$

The inverse quantized residuals, $Q^{-1}$ ($Q(r_{i,j})$), are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

2.10. Intra Chroma Coding

In addition to the intra chroma prediction modes, cross-component linear model (CCLM) and joint chroma residual coding are introduced in VVC.

2.10.1. Cross-Component Linear Model (CCLM)

To reduce the cross-component redundancy, a CCLM prediction mode is used in the VTM4, for which the chroma samples are predicted based on the reconstructed luma samples of the same CU by using a linear model as follows:

$$pred_C(i,j) = \alpha \cdot rec_L'(i,j) + \beta$$

where $pred_C(i,j)$ represents the predicted chroma samples in a CU and $rec_L(i,j)$ represents the downsampled reconstructed luma samples of the same CU. Linear model parameter $\alpha$ and $\beta$ are derived from the relationship between luma values and chroma values from four samples at specific positions. Among the four samples, the two larger values are averaged, and the two smaller values are averaged. The averaged values are then utilized to derive the linear model parameters.

2.10.2. Joint Chroma Residual Coding

If chrominance reshaper is active, reshaping is applied to the received residual identically to what is done in separate coding modes (that is, the joint residual signal is reshaped). On the encoder side the average of positive Cb residual and negative Cr residual are used as the joint residual when testing this mode:

$$resJoint = (resCb - resCr)/2$$

One bin indicator is signaled in the bitstream to enable the mode. In the case the mode is enabled a joint residual signal is coded in the bitstream. On the decoder side the joint residual is used for Cb component and a negative version of the residual is applied for Cr.

2.11. Sub-block Transform (SBT) in VVC

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode, since almost no coding gain is achieved.

2.11.1. Sub-Block TU Tiling

Figure 12:
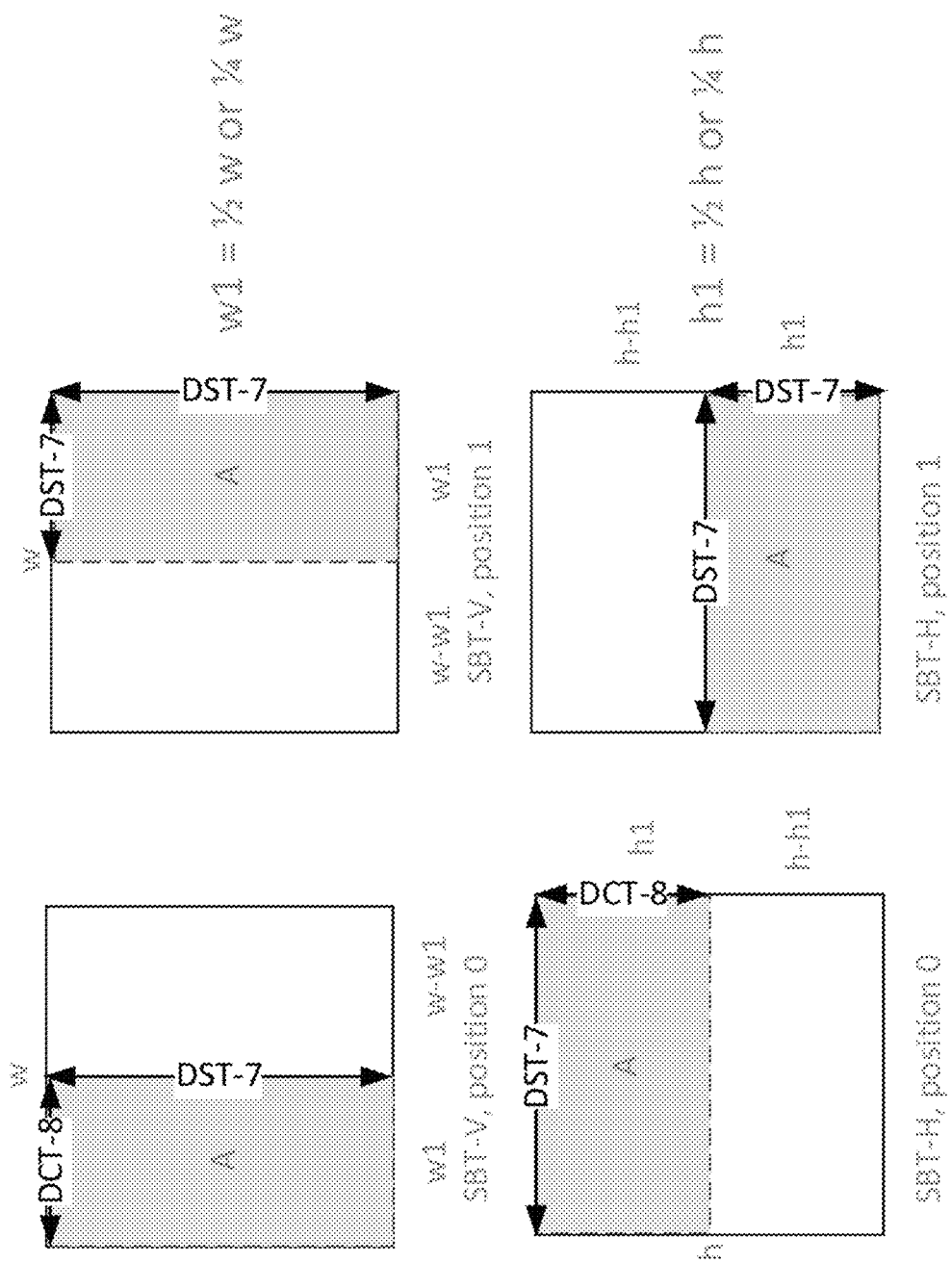
FIG. 12 is an illustration of sub-block transform modes SBT vertical (SBT-V) and SBT horizontal (SBT-H). (The grey area is a transform unit (TU) which may have non-zero coefficients; the white area is a zero-out TU with all zero coefficients).

When SBT is used for a inter CU, SBT type and SBT position information are further decoded from the bitstream. There are two SBT types and two SBT positions, as indicated in FIG. 12. For SBT-V (or SBT-H), the TU width (or height) may equal to half of the CU width (or height) or ¼ of the CU width (or height), signaled by another flag, resulting in 2:2 split or 1:3/3:1 split. The 2:2 split is like a binary tree (BT) split while the 1:3/3:1 split is like an asymmetric binary tree (ABT) split. If one side of CU is 8 in luma samples, the 1:3/3:1 split along this side is not allowed. Hence, there are at most 8 SBT modes for a CU.

Figure 13:
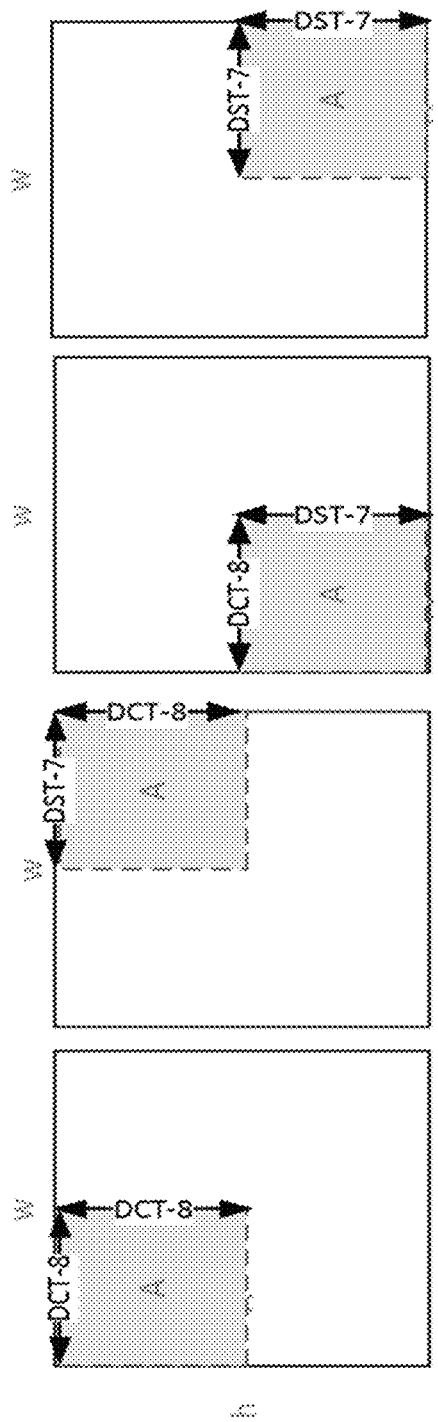
FIG. 13 is an illustration of sub-block transform modes SBT quad tree (SBT-Q).

Quad-tree (QT) split is further used to tile one CU into 4 sub-blocks, and still one sub-block has residual, as shown in FIG. 13. This SBT type is denoted as SBT-Q. This part was not adopted by VVC.

SBT-V, SBT-H and SBT-Q are allowed for CU with width and height both no larger than maxSbtSize. The maxSbtSize is signaled in sequence parameter set (SPS). For HD and 4 K sequences, maxSbtSize is set as 64 by encoder; for other smaller resolution sequences, maxSbtSize is set as 32.

2.11.2. Transform Type of the Sub-Block

Position-dependent transform is applied on luma transform blocks in SBT-V and SBT-H (chroma TB always using discrete cosine transform (DCT)-2). The two positions of SBT-H and SBT-V are associated with different core transforms. More specifically, the horizontal and vertical transforms for each SBT position is specified in FIG. 12. For example, the horizontal and vertical transforms for SBT-V position 0 is DCT-8 and discrete sine transform (DST)-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

FIG. 12 is an illustration of sub-block transform modes SBT-V and SBT-H (The grey area is a TU which may have non-zero coefficients; the white area is a zero-out TU with all zero coefficients).

FIG. 13 is an illustration of sub-block transform modes SBT-Q.

2.12. Partition Tree

In VTM5, the coding tree scheme supports the ability for the luma and chroma to have a separate block tree structure. Currently, for P and B slices, the luma and chroma CTBs in one CTU have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

3. Examples of Technical Problems Addressed by the Solutions Described in this Document How to apply ACT to the VVC design needs to be studied, especially the interaction between ACT and other tools needs to be resolved:

1. ILR is to convert the luma component from a whole picture/slice/tile from the original domain to reshaped domain and code everything in the reshaped domain. However, for the chroma component, it is coded in the original domain. ACT requires to get the residual signal of pixels for three-color components.
2. How to handle ACT when dual tree is enabled.

4. Examples of Solutions and Embodiments

The listing below should be considered as examples to explain general concepts. These inventions should not be interpreted in a narrow way. Furthermore, these techniques can be combined in any manner.

In the following discussion, a CU may comprise information associated to all the three-color components with the single tree coding structure. Or a CU may comprise information only associated to the luma color component with the mono-color coding. Or a CU may comprise information only associated to the luma color component (e.g., Y component in YCbCr format or G component in GBR format) with the dual tree coding structure. Or a CU may comprise information only associated to the two chroma components (e.g., Cb and Cr components in YCbCr format or B and R components in GBR format) with the dual-tree coding structure.

In the following description, a "block" may refer to coding unit (CU) or a transform unit (TU) or any rectangle or polygonal region of video data. a "current block" may refer to a current being decoded/coded coding unit (CU) or a current being decoded/coded transform unit (TU) or any being decoded/coded coding rectangle region of video data. "CU" or "TU" may be also known as "coding block" and" transform block".

In the following discussions, the term 'ACT' may represent any technology that may convert the original signals/prediction signals/reconstructed signals/residual signals of three-color components from one domain to another domain, not necessarily to be the same design in HEVC Screen Content Coding (SCC).

1. ACT is disabled for all blocks in a video unit when dual tree partitioning structure is enabled for the video unit (e.g., slice/tile/brick/picture/a region covering one or multiple CTUs).
   a. Indications of usage of ACT may be conditionally signaled based on the usage of the dual-tree partitioning structure.
      i. In one example, when the dual-tree partitioning structure is applied, the signaling of indications of usage of ACT may be skipped.
2. ACT is disabled for all blocks in a video unit when ILR is enabled for the video unit (e.g., slice/tile/brick/picture/a region covering one or multiple CTUs).
   a. Indications of usage of ACT may be conditionally signaled based on the usage of ILR.
      i. In one example, when ILR is applied, the signaling of indications of usage of ACT may be skipped.
3. ACT and a coding tool X are exclusively applied for a video block (e.g., CU/TU).
   a. In one example, X is CCLM. If CCLM is enabled for chroma components of the video block, ACT is disabled; and/or vice versa.
   b. In one example, X is joint chroma residual coding. If joint chroma residual coding is enabled for chroma components of the video block, ACT is disabled; and/or vice versa.
   c. In one example, X is matrix based intra prediction method. If the matrix based intra prediction method is enabled for the luma component of the video block, ACT is disabled; and/or vice versa.
   d. In one example, X is QR-BDPCM. If QR-BDPCM is enabled for the luma components of the video block, ACT is disabled; and/or vice versa.
   e. In one example, X is sub-block transform (SBT). If SBT is enabled for the luma components of the video block, ACT is disabled; and/or vice versa.
   f. In one example, X is multiple transform selection (MTS). If MTS is enabled for the luma components of the video block, ACT is disabled; and/or vice versa.
   g. In one example, X is Low frequency non-separable transform (LFNST). If LFNST is enabled, ACT is disabled; and/or vice versa.
   h. In one example, X is Pulse Code Modulation (PCM). If PCM is enabled, ACT is disabled; and/or vice versa.
   i. In one example, X is Transform Skip (TS). If TS is enabled, ACT is disabled; and/or vice versa.
   j. In one example, X is Intra Subblock Partitioning (ISP). If ISP is enabled, ACT is disabled; and/or vice versa.
   k. Alternatively, furthermore, indications of usage of ACT may be conditionally signaled based on the usage of the coding tool X.
      i. In one example, when the coding tool X is enabled, the signaling of indications of usage of ACT may be skipped.
   l. Alternatively, furthermore, indications of usage of tool X may be conditionally signaled based on the usage of ACT.
      i. In one example, when ACT is enabled, the signaling of indications of usage of the coding tool X may be skipped.
   m. Alternatively, the above mentioned tools and ACT may be both enabled for one video block.
4. ACT and dual tree partition structure may be both enabled for one video unit (e.g., picture/slice/tile/brick)
   a. Alternatively, furthermore, the signaling of usage of dual tree partition structure is moved from video unit-level to video block (e.g., coding tree unit (CTU)/coding tree block (CTB) or VPDU)-level.
   b. ACT and dual tree partition structure may be both enabled for one video block
      i. In one example, at the encoder side, ACT may be firstly applied to a CTU/CTB before partitioning of the CTU/CTB.
      ii. In one example, at the decoder side, a CTU/CTB may be first decoded, followed by inverse color-space transform.
5. ACT and ILR may be both enabled for one video unit (e.g., picture/slice/tile/brick)
   a. Alternatively, furthermore, the signaling of usage of ILR is moved from video unit-level to video block (e.g., coding unit (CU)/TU)-level.
   b. ACT and ILR may be both enabled for one video block (e.g., CU/TU).
      i. In one example, at the encoder side, ACT may be firstly applied, followed by ILR. That is, the prediction signal and residual signal is firstly generated in the original domain, ACT is applied to convert the residual signal from the original domain to a different color-space domain; and ILR is further applied to convert the residual signal to the reshaped domain.
      ii. In one example, at the decoder side, ILR may be firstly applied, followed by inverse color-space transform. That is, ILR is firstly applied to convert the decoded residual signal from the reshaped domain to the color-space domain; then ACT is applied to convert from the color-space domain to the original domain.
6. ACT and SBT may be both enabled for one video block (e.g., CU/TU).
   a. In one example, the predictor error in a converted color-space domain (e.g., original domain is red, green, blue (RGB), converted domain is YCoCg with ACT) is coded with two TUs. One of them is all zero coefficients and the other one has non-zero coefficients.
      i. Alternatively, furthermore, the one TU that has non-zero coefficients may be obtained via transforms or transform skip.

ii. In one example, how to split it to 2 TUs; and/or what kinds of transforms may be applied to one of the two TUs may be signalled, e.g., in a similar way as SBT.
7. For a video unit (e.g., slice/tile/brick/picture), ACT may be enabled in different levels, such as CU-level and TU-level.
   a. In one example, the signaling of usage of ACT may be in different levels, such as CU-level and TU-level, for different video blocks in the video unit.
   b. Whether to enable/signal the ACT in CU or TU level and/or whether to signal the usage of ACT may be determined based on coding characteristics.
      i. In one example, whether to enable/signal the ACT in CU or TU level may be determined based on the dimensions of the current CU. Suppose the width and height of the current CU are denoted as W and H, respectively.
         1. For example, whether to enable/signal the ACT in CU or TU level may be determined based on whether the current CU has a size greater than the VPDU size.
            a. In one example, if current CU has a size greater than the VPDU size, CU-level signaling/usage of ACT may be applied (i.e., all TUs share the same on/off control of ACT). Otherwise, TU-level signaling/usage of ACT may be applied.
            b. Alternatively, if current CU has a size greater than the VPDU size, TU-level signaling/usage of ACT may be applied (i.e., all TUs share the same on/off control of ACT). Otherwise, CU-level signaling/usage of ACT may be applied.
            c. In one example, if current CU has a size greater than the VPDU size, ACT is disabled without being signaled.
         2. In one example, whether to enable/signal the ACT in CU or TU level may be determined based on the current CU has a size greater than the maximum TU size.
         3. In one example, ACT is disabled when W>=T1 and H>=T2. E.g. T1=T2=32.
            a. Alternatively, ACT is disabled when W>=T1 or H>=T2. E.g. T1=T2=32.
            b. Alternatively, ACT is disabled when W<=T1 and H<=T2. E.g. T1=T2=8.
            c. Alternatively, ACT is disabled when W<=T1 or H<=T2. E.g. T1=T2=8.
            d. Alternatively, ACT is disabled when W*H>=T. E.g. T=64.
      ii. In one example, whether to enable/signal the ACT in CU or TU level may be determined based on the current CU is coded with sub-block partition tools, such as ISP.

Figure 14:
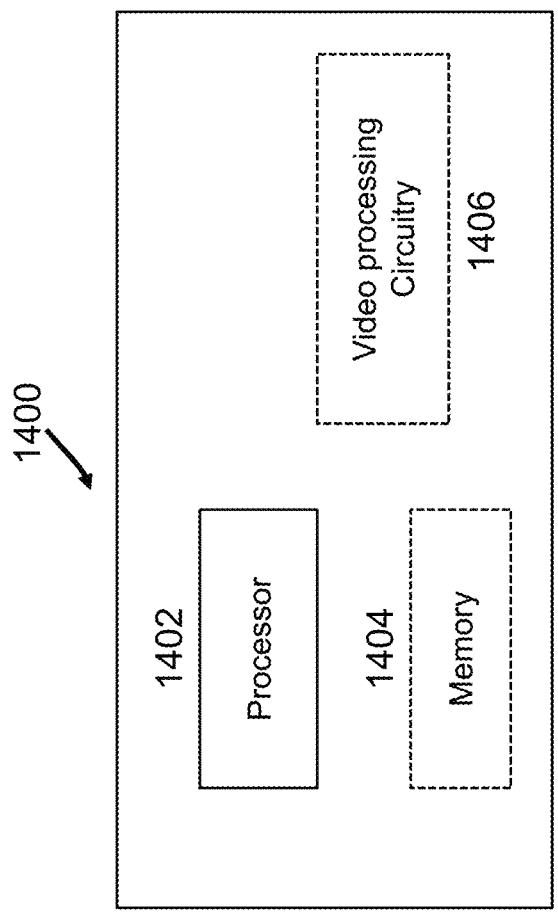
FIGS. 14 and 15 are block diagrams of an example apparatus for video processing.

FIG. 14 is a block diagram of a video processing apparatus 1400. The apparatus 1400 may be used to implement one or more of the methods described herein. The apparatus 1400 may be embodied in a smartphone, tablet, computer, Internet of Things (IoT) receiver, and so on. The apparatus 1400 may include one or more processors 1402, one or more memories 1404 and video processing hardware 1406. The processor(s) 1402 may be configured to implement one or more methods described in the present document. The memory (memories) 1404 may be used for storing data and code used for implementing the methods and techniques described herein. The video processing hardware 1406 may be used to implement, in hardware circuitry, some techniques described in the present document.

Figure 15:
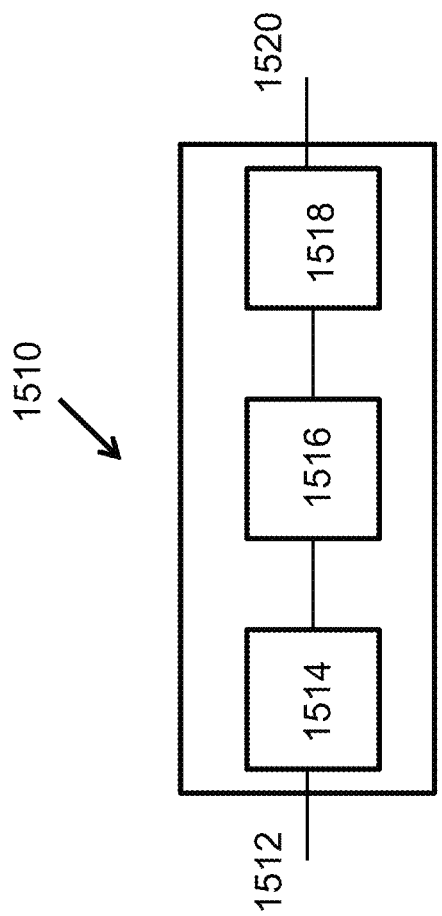

FIG. 15 is another example of a block diagram of a video processing system in which disclosed techniques may be implemented. FIG. 15 is a block diagram showing an example video processing system 1510 in which various techniques disclosed herein may be implemented. Various implementations may include some or all of the components of the system 1510. The system 1510 may include input 1512 for receiving video content. The video content may be received in a raw or uncompressed format, e.g., 8 or 10 bit multi-component pixel values, or may be in a compressed or encoded format. The input 1512 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1510 may include a coding component 1514 that may implement the various coding or encoding methods described in the present document. The coding component 1514 may reduce the average bitrate of video from the input 1512 to the output of the coding component 1514 to produce a coded representation of the video. The coding techniques are therefore sometimes called video compression or video transcoding techniques. The output of the coding component 1514 may be either stored, or transmitted via a communication connected, as represented by the component 1516. The stored or communicated bitstream (or coded) representation of the video received at the input 1512 may be used by the component 1518 for generating pixel values or displayable video that is sent to a display interface 1520. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 14 or 15.

Figure 16A:
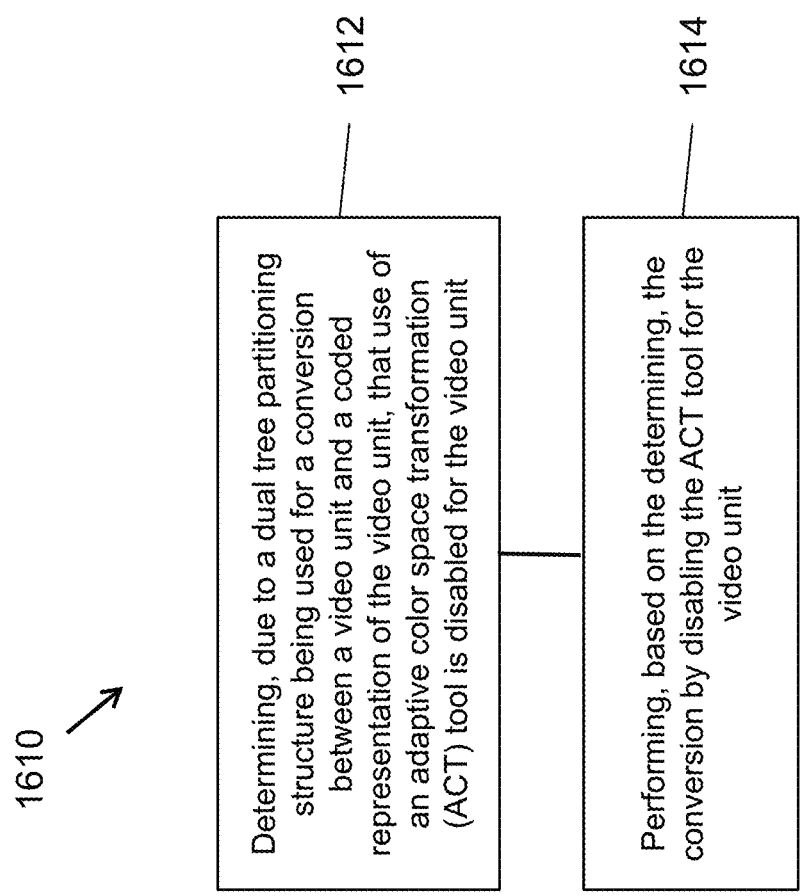
FIGS. 16A and 16B are flowcharts for example methods of video processing based on some implementations of the disclosed technology.

FIG. 16A is a flowchart of an example method 1610 of video processing. The method 1610 includes, at step 1612, determining, due to a dual tree partitioning structure being used for a conversion between a video unit and a coded representation of the video unit, that use of an adaptive color space transformation (ACT) tool is disabled for the video unit. The method 1610 further includes, at step 1614, performing, based on the determining, the conversion by disabling the ACT tool for the video unit. In some implementations of the present method 1610 and other examples methods, use of the ACT tool comprises: converting, during encoding, a representation of a visual signal from a first color domain to a second color domain, or converting, during decoding, a representation of a visual signal from the second color domain to the first color domain.

Figure 16B:
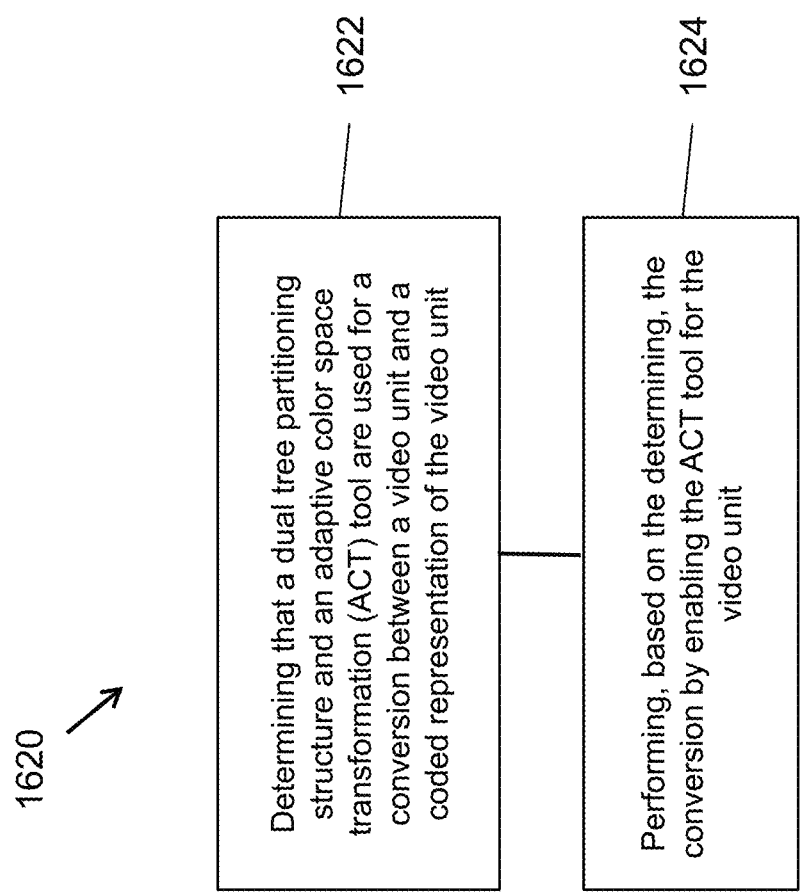

FIG. 16B is a flowchart of an example method 1620 of video processing. The method 1620 includes, at step 1622, determining that a dual tree partitioning structure and an adaptive color space transformation (ACT) tool are used for a conversion between a video unit and a coded representation of the video unit. The method 1620 further includes, at step 1624, performing, based on the determining, the conversion by enabling the ACT tool for the video unit.

Figure 17A:
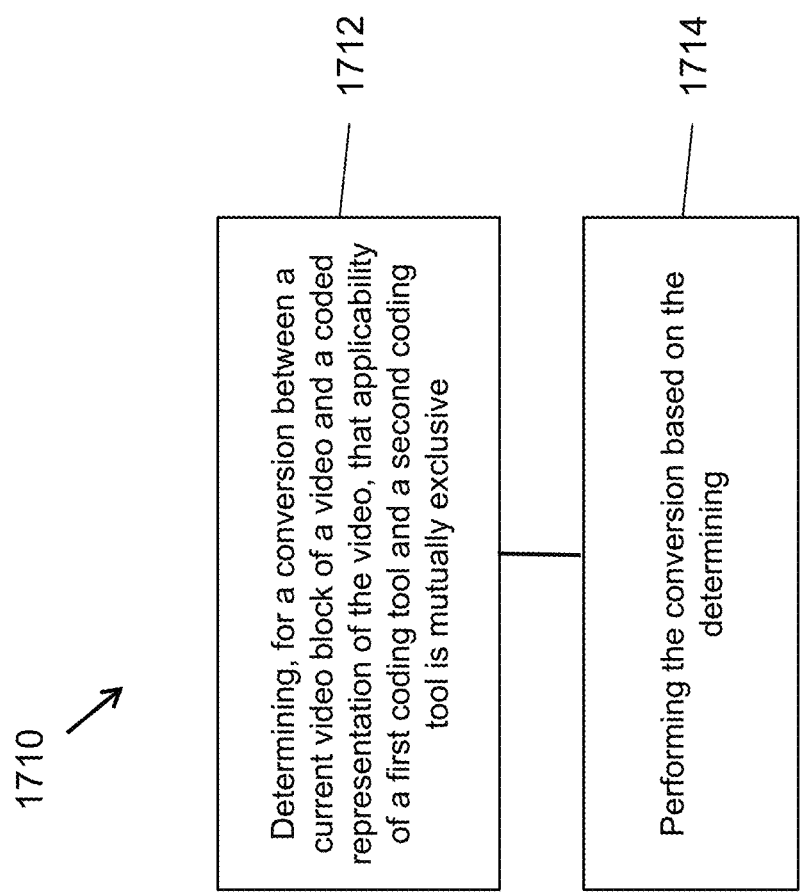
FIGS. 17A to 17E are flowcharts for example methods of video processing based on some implementations of the disclosed technology.

FIG. 17A is a flowchart of an example method 1710 of video processing. The method 1710 includes, at step 1712, determining, for a conversion between a current video block of a video and a coded representation of the video, that applicability of a first coding tool and a second coding tool is mutually exclusive. The method 1710 further includes, at step 1714, performing the conversion based on the determining.

Figure 17B:
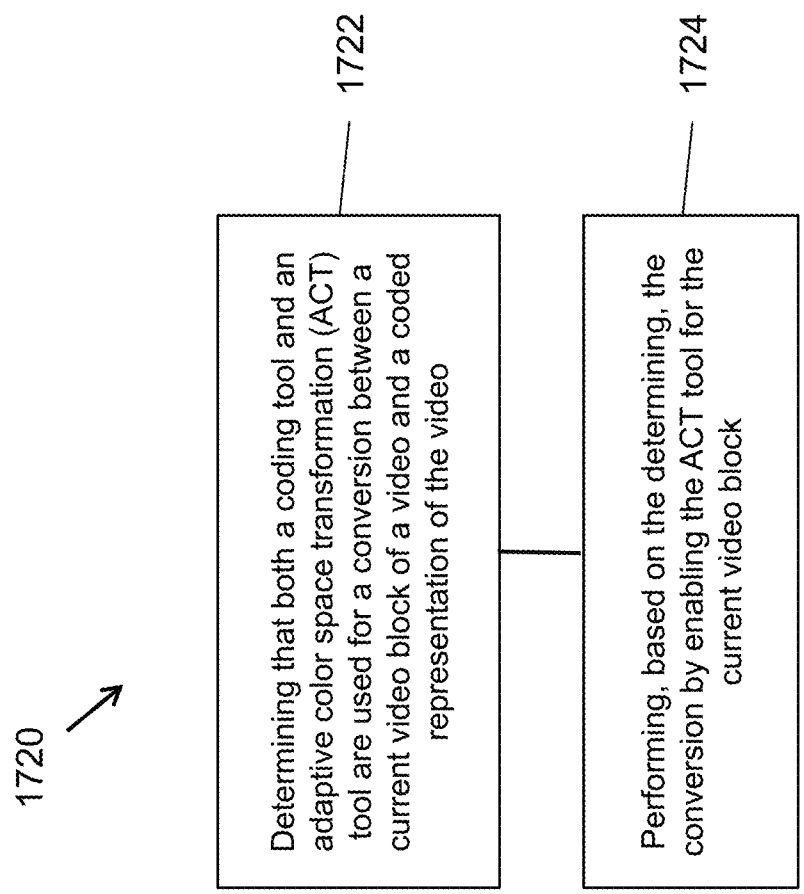

FIG. 17B is a flowchart of an example method 1720 of video processing. The method 1720 includes, at step 1712, determining that both a coding tool and an adaptive color space transformation (ACT) tool are used for a conversion between a current video block of a video and a coded representation of the video. The method 1720 further includes, at step 1724, performing, based on the determining, the conversion by enabling the ACT tool for the current video block.

Figure 17C:
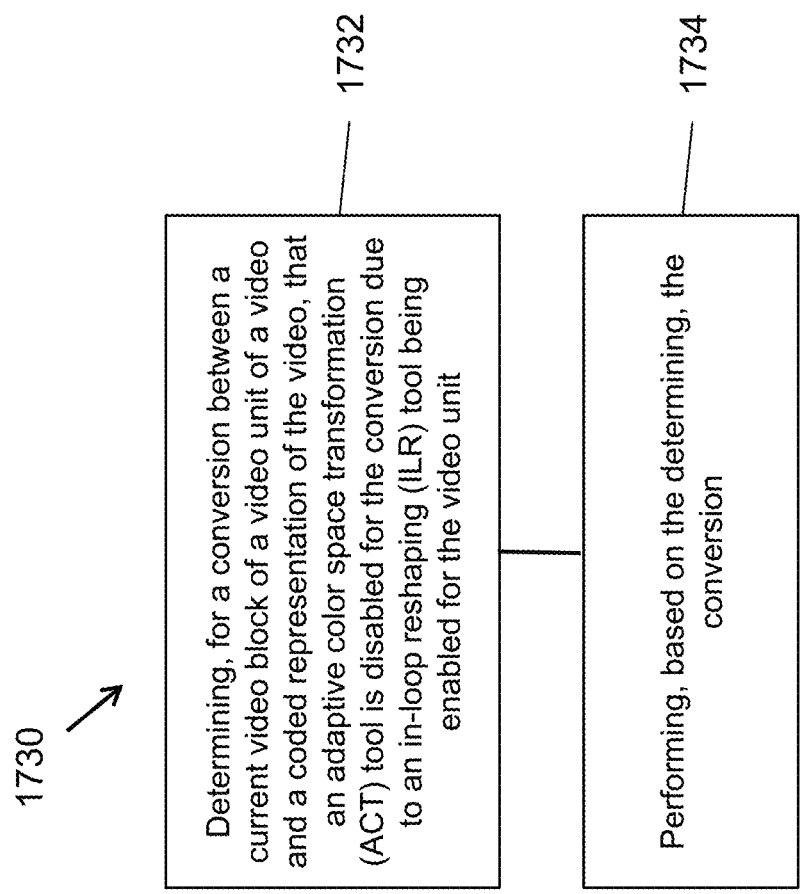

FIG. 17C is a flowchart of an example method 1730 of video processing. The method 1730 includes, at step 1732, determining, for a conversion between a current video block of a video unit of a video and a coded representation of the video, that an adaptive color space transformation (ACT) tool is disabled for the conversion due to an in-loop reshaping (ILR) tool being enabled for the video unit. The method 1730 further includes, at step 1734, performing, based on the determining, the conversion. In some implementations of the present method 1730 and other examples methods, the use of the ILR tool includes constructing the video unit based on a luma reshaping between a first domain and a second domain and/or a chroma residue scaling in a luma-dependent manner.

Figure 17D:
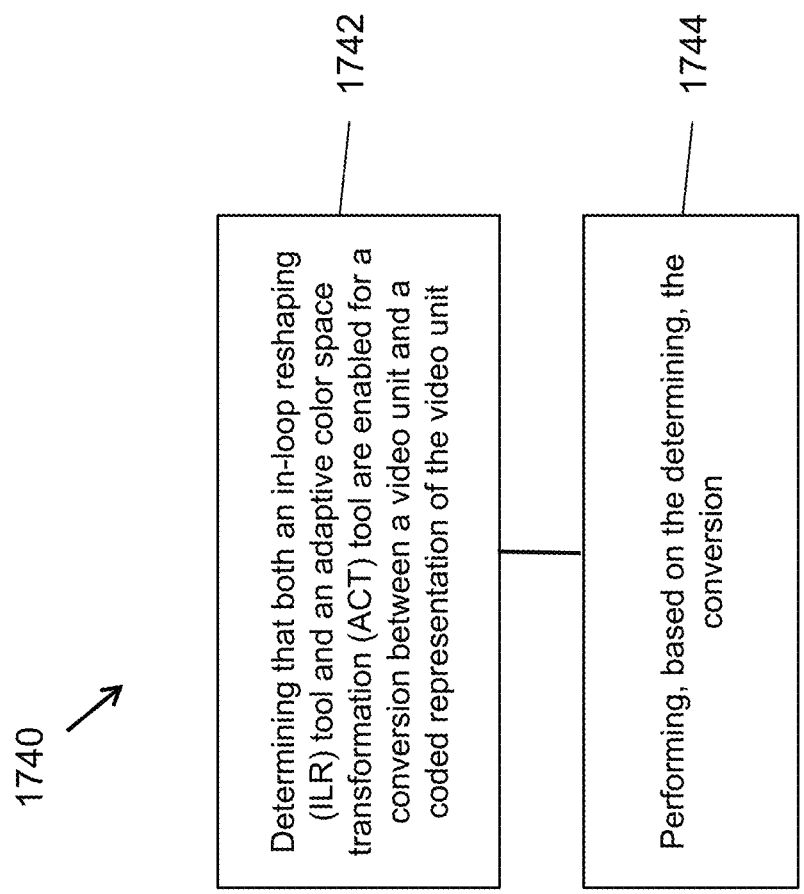

FIG. 17D is a flowchart of an example method 1740 of video processing. The method 1740 includes, at step 1742, determining that both an in-loop reshaping (ILR) tool and an adaptive color space transformation (ACT) tool are enabled for a conversion between a video unit and a coded representation of the video unit. The method 1740 further includes, at step 1744, performing, based on the determining, the conversion.

Figure 17E:
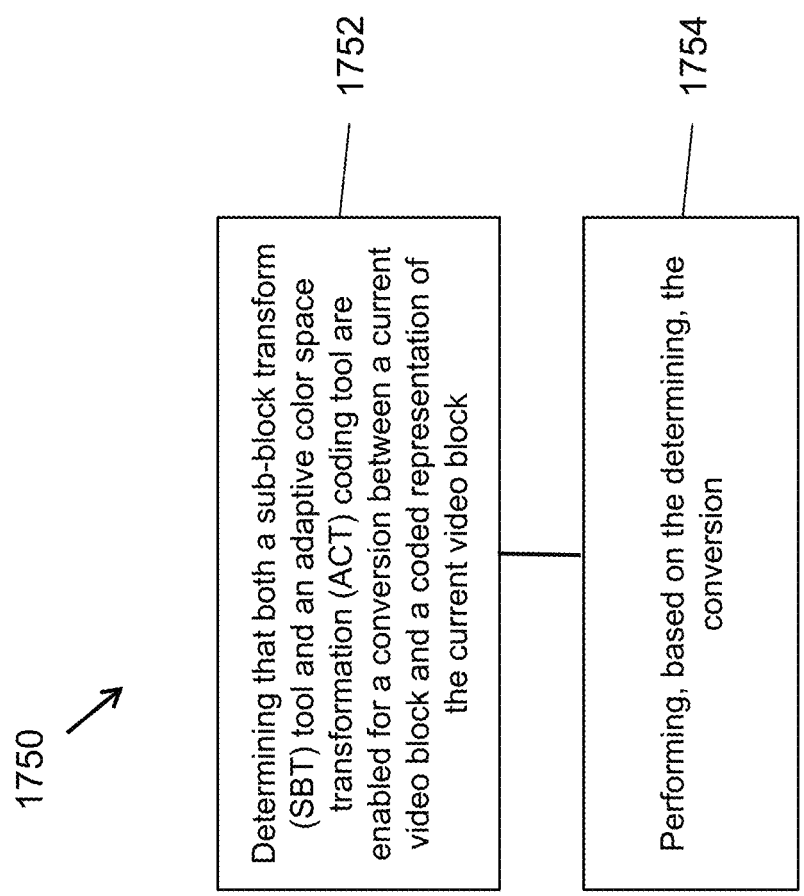

FIG. 17E is a flowchart of an example method 1750 of video processing. The method 1750 includes, at step 1752, determining that both a sub-block transform (SBT) tool and an adaptive color space transformation (ACT) coding tool are enabled for a conversion between a current video block and a coded representation of the current video block. The method 1750 further includes, at step 1754, performing, based on the determining, the conversion. In some implementations of the present method 1750 and other example methods, use of the SBT tool comprises applying a transform process or an inverse transform process on a sub-part of a prediction residual block.

Figure 18:
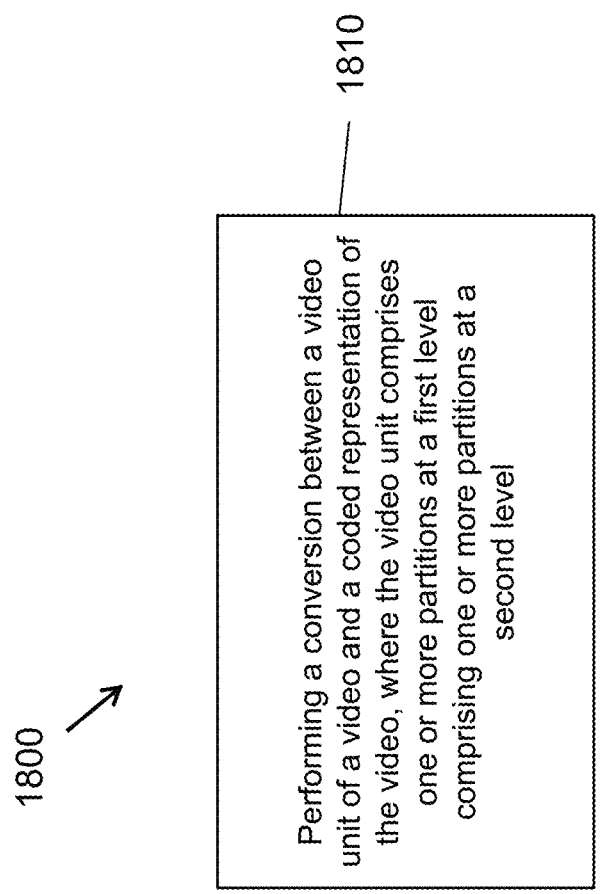
FIG. 18 is a flowchart for an example method of video processing based on some implementations of the disclosed technology.

FIG. 18 is a flowchart of an example method 1800 of video processing. The method 1800 includes, at step 1810, performing a conversion between a video unit of a video and a coded representation of the video, where the video unit comprises one or more partitions at a first level comprising one or more partitions at a second level. In some implementations, the coded representation conforms to a formatting rule, wherein the formatting rule specifies whether to include, or a partition level at which a syntax element indicative of use of an adaptive color space transformation (ACT) tool for representing the one or more second level partitions in the coded representation is included in the coded representation, wherein the partition level is one of the first level, the second level or the video unit.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

Various solutions and embodiments described in the present document are further described using a list of clauses. The first set of clauses describe certain features and aspects of the disclosed techniques in the previous section.

Item 1 in previous section provides additional examples of the following clauses.

1. A method of video processing, comprising: determining that due to a dual tree partitioning structure being used for a conversion between a video unit and a bitstream representation of the video unit, that use of adaptive color space transformation (ACT) is disabled for the video unit; and performing, based on the determining, the conversion by disabling the ACT for the vide unit.

2. The method of clause 1, wherein the bitstream representation excludes bits for providing information about usage of the ACT.

Item 2 in previous section provides additional examples of the following clauses.

1. A method of video processing, comprising: determining, due to an in-loop reshaper being enabled for use for a conversion between a video unit and a bitstream representation of the video unit, to disable an adaptive color space transformation (ACT) for the conversion; and performing, based on the determining, the conversion by disabling the ACT for the video unit.
2. The method of clause 1, wherein the bitstream representation includes bits for providing information about usage of the ILR.

Item 3 in previous section provides additional examples of the following clauses.

3. A method of video processing. comprising: determining, due to a coding tool being used for a conversion between a video unit and a bitstream representation of the video unit, that an adaptive color space transformation tool is disabled for the conversion; and performing, based on the determining, the conversion by disabling the ACT for the video unit.
4. The method of clause 3, wherein the coding tool corresponds to a cross-component linear model tool.
5. The method of clause 3, wherein the coding tool corresponds to a joint chroma residual coding.
6. The method of clause 3, wherein the coding tool corresponds to a multiple transform selection (MTS) coding tool.

Item 4 in previous section provides additional examples of the following clauses.

7. A method of video processing, comprising: determining that both a dual tree partitioning structure and an adaptive color space transformation (ACT) coding tool are used for a conversion between a video unit and a bitstream representation of the video unit; and performing, based on the determining, the conversion by enabling the ACT for the video unit.
8. The method of clause 7, wherein the bitstream representation includes signaling of the dual partition tree structure at a video block level that is a finer level than the video unit level.

Item 5 in previous section provides additional examples of the following clauses.

9. A method of video processing, comprising: determining that both an in-loop reshaping (ILR) and an adaptive color space transformation (ACT) coding tool are used for a conversion between a video unit and a bitstream representation of the video unit; and performing, based on the determining, the conversion using the ILR and the ACT coding tool.
10. The method of clause 9, wherein the performing the conversion includes, during encoding, first applying the ACT coding tool and next applying the ILR on a result of the applying the ACT.
11. The method of clause 9, wherein the performing the conversion includes, first applying the ILR and then an inverse color space transform is applied to a result of the ILR.

Item 6 in previous section provides additional examples of the following clauses.

12. A method of video processing, comprising: determining that both an (SBT) and an adaptive color space transformation (ACT) coding tool are used for a conversion between a video unit and a bitstream representation of the video unit; and performing, based on the determining, the conversion using the SBT and the ACT coding tool.
13. The method of clause 12, wherein a prediction error during the conversion is transformed from an RGB color space to a YCoCg color space.
14. The method of clause 13, wherein the prediction error, after the transforming, is coded using at least two transform unit (TU) partitions.

Item 7 in previous section provides additional examples of the following clauses.

15. The method of any of above clauses, wherein the video unit comprises slice or a tile or a brick or a picture.
16. The method of clause 15, wherein the determining is performed at a sub-video unit level, wherein the sub-unit level corresponds to a coding unit (CU) or a transform unit (TU).
17. The method of clause 16, wherein the determining at the sub-video unit level is based on coding characteristics at the sub-unit level.
18. The method of clause 17, wherein the coding characteristics include a size of the CU and/or a size of the TU and/or a relationship between the size of the CU and the size of the TU.
19. The method of any of above clauses, wherein the conversion includes decoding the bitstream representation to generate the video unit.
20. The method of any of above clauses, wherein the conversion includes encoding the video unit into the bitstream representation.
21. A video encoder apparatus comprising a processor configured to implement a method recited in any one or more of above clauses.
22. A video decoder apparatus comprising a processor configured to implement a method recited in any one or more of above clauses.
23. A computer-readable medium having code for implementing a method described in any one or more of above clauses stored thereupon.

The second set of clauses describe certain features and aspects of the disclosed techniques in the previous section, for example, Example Implementations 1 and 4.

1. A method of video processing, comprising: determining, due to a dual tree partitioning structure being used for a conversion between a video unit and a coded representation of the video unit, that use of an adaptive color space transformation (ACT) tool is disabled for the video unit; and performing, based on the determining, the conversion by disabling the ACT tool for the video unit, wherein the use of the ACT tool comprises: converting, during encoding, a representation of a visual signal from a first color domain to a second color domain, or converting, during decoding, a representation of a visual signal from the second color domain to the first color domain.
2. The method of clause 1, wherein the visual signal comprises an original signal, a prediction signal, a reconstructed signal or a residual signal.
3. The method of clause 1, wherein the video unit corresponds to a slice, a tile, a brick, a picture, or a video region covering one or more coding tree units.
4. The method of clause 1, wherein the ACT tool is disabled for all coding blocks in the video unit and the coding blocks are generated based on the dual tree partitioning structure.
5. The method of clause 1, wherein the dual tree partitioning structure uses separate partition trees for luma and chroma components.

6. The method of clause 1, wherein the use of the ACT tool is signaled based on use of the dual tree partitioning structure.
7. The method of clause 1, wherein the coded representation excludes bits for providing information about the use of the ACT tool due to usage of the dual tree partitioning structure.
8. A method of video processing, comprising: determining that a dual tree partitioning structure and an adaptive color space transformation (ACT) tool are used for a conversion between a video unit and a coded representation of the video unit; and performing, based on the determining, the conversion by enabling the ACT tool for the video unit, wherein use of the ACT tool comprises: converting, during encoding, a representation of a visual signal from a first color domain to a second color domain, or converting, during decoding, a representation of a visual signal from the second color domain to the first color domain.
9. The method of clause 8, wherein the visual signal comprises an original signal, a prediction signal, a reconstructed signal or a residual signal.
10. The method of clause 8, wherein the video unit corresponds to a slice, a tile, a brick, a picture, or a vide region covering one or more coding tree units.
11. The method of clause 8, wherein the coded representation includes signaling of the dual partition tree structure at a video block level that is a finer level than the video unit level.
12. The method of clause 8, wherein both the dual tree partitioning structure and the ACT tool are enabled for a video block of the video unit.
13. The method of clause 12, wherein the performing conversion includes, during encoding, applying the ACT tool to the video block prior to a partitioning of the video block.
14. The method of clause 12, wherein the performing conversion includes decoding the vide block and then performing an inverse color space transform on a result of the decoding.
15. The method of any of clauses 1 to 14, wherein the conversion includes decoding the coded representation to generate the video unit.
16. The method of any of clauses 1 to 14, wherein the conversion includes encoding the video unit into the coded representation.
17. A video processing apparatus comprising a processor configured to implement a method recited in any one or more of clauses 1 to 16.
18. A computer readable medium storing program code that, when executed, causes a processor to implement a method recited in any one or more of clauses 1 to 16.

The third set of clauses describe certain features and aspects of the disclosed techniques in the previous section, for example, Example Implementations 2, 3, 5 and 6.

1. A video processing method, comprising: determining, for a conversion between a current video block of a video and a coded representation of the video, that applicability of a first coding tool and a second coding tool is mutually exclusive; and performing the conversion based on the determining, wherein the first coding tool corresponds to an adaptive color space transformation (ACT) tool; wherein use of the ACT tool comprises: converting, during encoding, a representation of a visual signal from a first color domain to a second color domain, or converting, during decoding, a representation of a visual signal from the second color domain to the first color domain.
2. The method of clause 1, wherein the visual signal comprises an original signal, a prediction signal, a reconstructed signal or a residual signal.
3. The method of clause 1, wherein the second coding tool corresponds to a cross-component linear model tool that uses a linear mode to derive prediction values of a chroma component from another component.
4. The method of clause 1, wherein the second coding tool corresponds to a joint chroma residual coding tool in which prediction residual block of two color components are jointly processed.
5. The method of clause 1, wherein the second coding tool corresponds to a matrix based intra prediction tool that includes generating a prediction signal based on predefined matrices and samples obtained along two axes of boundaries of the current video block.
6. The method of clause 1, wherein the second coding tool corresponds to a quantized residual block differential pulse-code modulation (QR-BDPCM) tool that includes coding residual differences between quantized residual and prediction residual into the coded representation or deriving quantized residual from the residual differences included in the coded representation.
7. The method of clause 1, wherein the second coding tool corresponds to a sub-block transform (SBT) tool in which the current video block is split into multiple sub-blocks and a transform or an inverse transform is only performed on a part of sub-blocks.
8. The method of clause 1, wherein the second coding tool corresponds to a multiple transform selection (MTS) tool that selects, for the current video block, a transform among multiple transforms.
9. The method of clause 1, wherein the second coding tool corresponds to a low frequency non-separable transform (LFNST) tool that includes applying, during encoding, a forward secondary transform to an output of a forward primary transform applied to a residual of a video block prior to quantization, or includes applying, during decoding, an inverse secondary transform to an output of dequantization to the video block before applying an inverse primary transform
10. The method of clause 1, wherein the second coding tool corresponds to a pulse code modulation (PCM) tool that digitally represents a sampled analog signal.
11. The method of clause 1, wherein the second coding tool corresponds to a transform skip (TS) mode in which a transform is bypassed or an identify transform is applied
12. The method of clause 1, wherein the second coding tool corresponds to an intra subblock partitioning (ISP) tool that includes dividing luma intra-predicted blocks vertically or horizontally into sub-partitions.
13. The method of clause 1, wherein the use of the first coding tool is signaled based on use of the second coding tool.
14. The method of clause 13, wherein the coded representation excludes bits for providing information about the use of the first coding tool due to usage of the second coding tool.
15. The method of clause 1, wherein use of the second coding tool is signaled based on the use of the first coding tool.

16. The method of clause 15, wherein the coded representation excludes bits for providing information about the use of the second coding tool due to usage of the first coding tool.
17. A method of video processing, comprising: determining that both a coding tool and an adaptive color space transformation (ACT) tool are used for a conversion between a current video block of a video and a coded representation of the video; and performing, based on the determining, the conversion by enabling the ACT tool for the current video block, wherein use of the ACT tool comprises: converting, during encoding, a representation of a visual signal from a first color domain to a second color domain, or converting, during decoding, a representation of a visual signal from the second color domain to the first color domain.
18. The method of clause 17, wherein the coding tool comprises a matrix based intra prediction (MIP) tool, a sub-block transform (SBT) tool, a multiple transform selection (MTS), a low frequency non-separable transform (LFNST) tool, or a transform skip (TS) tool.
19. A method of video processing, comprising: determining, for a conversion between a current video block of a video unit of a video and a coded representation of the video, that an adaptive color space transformation (ACT) tool is disabled for the conversion due to an in-loop reshaping (ILR) tool being enabled for the video unit; and performing, based on the determining, the conversion, and wherein the use of the ILR tool includes constructing the video unit based on a luma reshaping between a first domain and a second domain and/or a chroma residue scaling in a luma-dependent manner, and wherein use of the ACT tool comprises: converting, during encoding, a representation of a visual signal from a first color domain to a second color domain, or converting, during decoding, a representation of a visual signal from the second color domain to the first color domain.
20. The method of clause 19, wherein the video unit corresponds to a slice, a tile, a brick, a picture, or a video region covering one or more coding tree units.
21. The method of clause 19, wherein the use of the ACT tool is signaled based on the use of the ILR tool.
22. The method of clause 19, wherein the coded representation excludes bits for providing information about the use of the ACT due to usage of the ILR.
23. A method of video processing, comprising: determining that both an in-loop reshaping (ILR) tool and an adaptive color space transformation (ACT) tool are enabled for a conversion between a video unit and a coded representation of the video unit; and performing, based on the determining, the conversion, and wherein use of the ILR tool includes constructing the current video unit based on a first domain and a second domain and/or scaling chroma residue in a luma-dependent manner, and wherein use of the ACT tool comprises: converting, during encoding, a representation of a visual signal from a first color domain to a second color domain, or converting, during decoding, a representation of a visual signal from the second color domain to the first color domain.
24. The method of clause 23, wherein the video unit corresponds to a slice, a tile, a brick, a picture, or a video region covering one or more coding tree units.
25. The method of clause 23, wherein the coded representation includes signaling of the dual partition tree structure at a video block level that is a finer level than the video unit level.
26. The method of clause 23, wherein both the ILR tool and the ACT tool are enabled for a video block of the video unit.
27. The method of clause 26, wherein the performing the conversion includes, during encoding, first applying the ACT tool to the video block and next applying the ILR tool on a result of the applying the ACT tool.
28. The method of clause 26, wherein the performing the conversion includes first applying the ILR tool to the video block and then applying an inverse color space transform on a result of the ILR tool.
29. A method of video processing, comprising: determining that both a sub-block transform (SBT) tool and an adaptive color space transformation (ACT) coding tool are enabled for a conversion between a current video block and a coded representation of the current video block; and performing, based on the determining, the conversion, wherein use of the SBT tool comprises applying a transform process or an inverse transform process on a sub-part of a prediction residual block, and wherein use of the ACT tool comprises: converting, during encoding, a representation of a visual signal from a first color domain to a second color domain, or converting, during decoding, a representation of a visual signal from the second color domain to the first color domain.
30. The method of clause 29, wherein a prediction error is converted from an RGB color space to a YCoCg color space before the transform process in encoding or converted from a YCoCg color space to an RGB color space after the inverse transform process in decoding.
31. The method of clause 30, wherein the prediction error is coded using two transform units (TUs) including a first transform unit (TU) and a second transform unit (TU).
32. The method of clause 31, wherein the first transform unit (TU) has all zero coefficient and the second transform unit (TU) has non-zero coefficients.
33. The method of clause 32, wherein the second transform unit (TU) is obtained by performing a transform or a transform skip.
34. The method of clause 31, wherein the coded representation includes information as to how to split the current video block to the two transform units (TUs) and/or types of transforms applied to at least one of the two transform units (TUs).
35. The method of any of clauses 1 to 34, wherein the conversion includes generating the video unit or the current video block from the coded representation.
36. The method of any of clauses 1 to 34, wherein the conversion includes generating the coded representation from the video unit or the current video block.
37. A video processing apparatus comprising a processor configured to implement a method recited in any one or more of clauses 1 to 36.
38. A computer readable medium storing program code that, when executed, causes a processor to implement a method recited in any one or more of clauses 1 to 36.

The fourth set of clauses describe certain features and aspects of the disclosed techniques in the previous section, for example, Example Implementation 7.

1. A video processing method, comprising: performing a conversion between a video unit of a video and a coded representation of the video, where the video unit comprises one or more partitions at a first level comprising one or more partitions at a second level, wherein the coded representation conforms to a formatting rule, wherein the formatting rule specifies whether to include, or a partition level at which a syntax element indicative of use of an adaptive color space transformation (ACT) tool for representing the one or more second level partitions in the coded representation is included in the coded representation, wherein the partition level is one of the first level, the second level or the video unit.

2. The method of clause 1, wherein the video unit corresponds to a slice or a tile or a brick or a picture.

3. The method of clause 1, wherein the use of the ACT tool comprises: converting, during encoding, a representation of a visual signal from a first color domain to a second color domain, or converting, during decoding, a representation of a visual signal from the second color domain to the first color domain.

4. The method of any of clauses 1 to 3, wherein the formatting rule specifies that different levels for different video blocks in the video unit.

5. The method of clause 4, wherein the different levels correspond to the coding unit (CU) and/or the transform unit (TU).

6. The method of any of clauses 1 to 5, wherein the formatting rule specifies the partition level based on coding characteristics of the conversion.

7. The method of clause 6, wherein the coding characteristics include a width (W) and/or a height (H) of a current coding unit.

8. The method of clause 7, wherein the formatting rule specifies the partition level based on whether the current coding unit has a size greater than a size of a virtual pipelining data unit (VPDU).

9. The method of clause 8, wherein the partition level corresponds to a coding unit (CU) level in a case that the current coding unit has a size greater than the size of the VPDU.

10. The method of clause 8, wherein the partition level corresponds a transform unit (TU) level in a case that the current coding unit has a size greater than the size of the VPDU.

11. The method of clause 8, wherein the formatting rule specifies not to include the syntax element due to the ACT tool disabled in a case that the current coding unit has a size greater than the size of the VPDU.

12. The method of clause 7, wherein the formatting rule specifies the partition level based on whether the current coding unit has a size greater than a maximum size of the transform unit (TU).

13. The method of clause 1, wherein the formatting rule specifies not to include the syntax element due to the ACT tool disabled in a case that $W>=T1$ and $H>=T2$, W and H corresponding to a width and a height of a current coding unit, respectively.

14. The method of clause 1, wherein the formatting rule specifies not to include the syntax element due to the ACT tool disabled in a case that $W>=T1$ or $H>=T2$, W and H corresponding to a width and a height of a current coding unit, respectively.

15. The method of clause 7, wherein the formatting rule specifies not to include the syntax element due to the ACT tool disabled in a case that $W<=T1$ and $H<=T2$, W and H corresponding to a width and a height of a current coding unit, respectively.

16. The method of clause 7, wherein the formatting rule specifies not to include the syntax element due to the ACT tool disabled in a case that $W<=T1$ or $H<=T2$, W and H corresponding to a width and a height of a current coding unit, respectively.

17. The method of clause 7, wherein the formatting rule specifies not to include the syntax element due to the ACT tool disabled in a case that $W*H>=T$, W and H corresponding to a width and a height of a current coding unit, respectively.

18. The method of clause 7, wherein the formatting rule specifies not to include the syntax element due to the ACT tool disabled in a case that $W*H<=T$, W and H corresponding to a width and a height of a current coding unit, respectively.

19. The method of clause 7, wherein the formatting rule specifies the partition level based on whether the current coding unit is coded with a sub-block partition tool.

20. The method of any of clauses 1 to 19, wherein the conversion includes generating the video unit from the coded representation.

21. The method of any of clauses 1 to 19, wherein the conversion includes generating the coded representation from the video unit.

22. A video processing apparatus comprising a processor configured to implement a method recited in any one or more of clauses 1 to 21.

23. A computer readable medium storing program code that, when executed, causes a processor to implement a method recited in any one or more of clauses 1 to 21.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
making a first determination, for a conversion between a current video unit of a video and a bitstream of the video, that applicability of a first coding mode and a second coding mode is mutually exclusive, wherein, for an encoding operation, the first coding mode converts visual signals from a first color domain to a second color domain, or for a decoding operation, the first coding mode converts the visual signals from the second color domain to the first color domain; and
performing the conversion based on the first determination;
wherein when the first coding mode is enabled, a third coding mode is allowed to be enabled for a luma component of the current video unit and disabled for a chroma component of the current video unit;
wherein in the third coding mode, differences between quantized residuals derived with an intra prediction and predictors of the quantized residuals are presented in the bitstream.

2. The method of claim 1, further comprising:
making a second determination, for the conversion, whether the first coding mode is applied to the current video unit based on a tree partitioning structure used for the current video unit; and
performing the conversion further based on the second determination.

3. The method of claim 2, wherein the first coding mode is not applied for the current video unit when a chroma component and a luma component have different partitioning structures for the current video unit.

4. The method of claim 2, wherein usage of the first coding mode is conditionally included in the bitstream based on the tree partitioning structure used for the current video unit.

5. The method of claim 4, wherein a single syntax element that indicates usage of the first coding mode is not included in the bitstream when a chroma component and a luma component have different partitioning structures for the current video unit.

6. The method of claim 4, wherein signalling of indication of usage of the first coding mode is skipped when a chroma component and a luma component have different partitioning structures for the current video unit.

7. The method of claim 1, wherein when the first coding mode is enabled for the current video unit, the second coding mode is disabled for the current video unit, or when the second coding mode is enabled for the current video unit, the first coding mode is disabled for the current video unit.

8. The method of claim 7, wherein the second coding mode uses a linear mode to derive prediction values of a chroma component of the current video unit from a luma component of the current video unit.

9. The method of claim 7, wherein the second coding mode splits the current video unit into multiple sub-regions, and the multiple sub-regions share a same intra mode.

10. The method of claim 7, wherein when the first coding mode is enabled, a fourth coding mode is enabled both for a luma component and a chroma component of the current video unit.

11. The method of claim 10, wherein the fourth coding mode uses a piecewise linear mode to map a luma component between different domains, and a scaling coefficient derived based on reconstructed luma samples to scale a chroma residue.

12. The method of claim 10, wherein the fourth coding mode splits a transform region into multiple transform sub-regions and only one transform sub-region has a non-zero residual sample, and wherein a size of the transform sub-region having the non-zero residual sample is smaller than or equal to other transform sub-regions.

13. The method of claim 1, wherein in the third coding mode, prediction samples are derived by performing a boundary down-sampling operation on reference samples based on a size of the current video unit, followed by a matrix vector multiplication operation, and selectively followed by an up-sampling operation.

14. The method of claim 1, wherein the conversion includes encoding the current video unit into the bitstream.

15. The method of claim 1, wherein the conversion includes decoding the current video unit from the bitstream.

16. An apparatus for processing video data comprising a processor and a non-transitory memory with instructions thereon, wherein the instructions upon execution by the processor, cause the processor to:
  determining, for a conversion between a current video unit of a video and a bitstream of the video, that applicability of a first coding mode and a second coding mode is mutually exclusive, wherein, for an encoding operation, the first coding mode converts visual signals from a first color domain to a second color domain, or for a decoding operation, the first coding mode converts the visual signals from the second color domain to the first color domain; and
  performing the conversion based on the determining;
  wherein when the first coding mode is enabled, a third coding mode is allowed to be enabled for a luma component of the current video unit and disabled for a chroma component of the current video unit;
  wherein in the third coding mode, differences between quantized residuals derived with an intra prediction and predictors of the quantized residuals are presented in the bitstream.

17. A non-transitory computer-readable storage medium storing instructions that cause a processor to:
  determining, for a conversion between a current video unit of a video and a bitstream of the video, that applicability of a first coding mode and a second coding mode is mutually exclusive, wherein, for an encoding operation, the first coding mode converts visual signals from a first color domain to a second color domain, or for a decoding operation, the first coding mode converts the visual signals from the second color domain to the first color domain; and
  performing the conversion based on the determining;
  wherein when the first coding mode is enabled, a third coding mode is allowed to be enabled for a luma component of the current video unit and disabled for a chroma component of the current video unit;
  wherein in the third coding mode, differences between quantized residuals derived with an intra prediction and predictors of the quantized residuals are presented in the bitstream.

18. A non-transitory computer-readable recording medium storing a bitstream of a video which is generated by a method performed by a video processing apparatus, wherein the method comprises:
  determining, for a current video unit of the video, that applicability of a first coding mode and a second coding mode is mutually exclusive, wherein, for an encoding operation, the first coding mode converts visual signals from a first color domain to a second color domain, or for a decoding operation, the first coding mode converts the visual signals from the second color domain to the first color domain; and
  generating the bitstream based on the determining;
  wherein when the first coding mode is enabled, a third coding mode is allowed to be enabled for a luma component of the current video unit and disabled for a chroma component of the current video unit;
  wherein in the third coding mode, differences between quantized residuals derived with an intra prediction and predictors of the quantized residuals are presented in the bitstream.

* * * * *